United States Patent [19]

Bonta

[11] Patent Number: 4,696,027

[45] Date of Patent: Sep. 22, 1987

[54] HANDOFF APPARATUS AND METHOD WITH INTERFERENCE REDUCTION FOR A RADIO SYSTEM

[75] Inventor: Jeffrey D. Bonta, Arlington Heights, Ill.

[73] Assignee: Motorola, Inc., Schaumburg, Ill.

[21] Appl. No.: 893,116

[22] Filed: Aug. 1, 1986

[51] Int. Cl.[4] ................................................ H04Q 7/04
[52] U.S. Cl. ........................................ 379/60; 455/33
[58] Field of Search ............... 379/63, 60, 59, 58, 379/56; 455/33, 34, 54

[56] References Cited

U.S. PATENT DOCUMENTS

| | | | |
|---|---|---|---|
| 3,328,698 | 6/1967 | Schreder | 325/304 |
| 3,663,762 | 5/1972 | Joel, Jr. | 379/60 |
| 3,764,915 | 10/1973 | Cox et al. | 325/53 |
| 3,819,872 | 6/1974 | Hamrick | 379/60 |
| 3,898,390 | 8/1975 | Wells et al. | 379/60 |
| 3,906,166 | 9/1975 | Cooper et al. | 379/60 |
| 4,025,853 | 5/1977 | Addeo | 325/55 |
| 4,144,411 | 3/1979 | Frenkiel | 379/60 |
| 4,144,412 | 3/1979 | Ito et al. | 379/60 |
| 4,384,362 | 5/1983 | Leland | 455/33 |
| 4,435,840 | 3/1984 | Kojima et al. | 455/33 |
| 4,485,486 | 11/1984 | Webb et al. | 455/33 |
| 4,525,861 | 6/1985 | Freeburg | 455/33 |
| 4,545,071 | 10/1985 | Freeburg | 455/33 |
| 4,556,760 | 12/1985 | Goldman | 379/60 |
| 4,597,105 | 6/1986 | Freeburg | 455/33 |
| 4,608,711 | 8/1986 | Goldman | 455/33 |

FOREIGN PATENT DOCUMENTS

| | | | |
|---|---|---|---|
| 8600486 | 1/1986 | European Pat. Off. | 379/60 |
| 0150348 | 8/1985 | Japan | 379/60 |

OTHER PUBLICATIONS

Electronic Industries Association, "EIA Interim Standard IS-3-B", Jul. 1984, Sections 3.7.2, 3.7.1.1, 3.7.1.2.4, 3.6.4, 3.6.3, 2.1.2.2, and pp. 1–3.

Primary Examiner—Robert Lev
Attorney, Agent, or Firm—Raymond A. Jenski; Rolland R. Hackbart

[57] ABSTRACT

A two way radio system employing power control of a remote station transmitter to produce a predetermined received signal level at a fixed site after handoff of the remote station from one radio channel to another is disclosed. A signal strength measurement is made on the in-use channel and a power level for the remote station transmitter is calculated from the measured signal strength, a predetermined nominal signal strength desired on the target radio channel, and a linear correlation of signal strength and remote station power level steps. The calculated remote station power level is then transmitted to the remote station as part of a handoff command.

25 Claims, 23 Drawing Figures

—PRIOR ART—

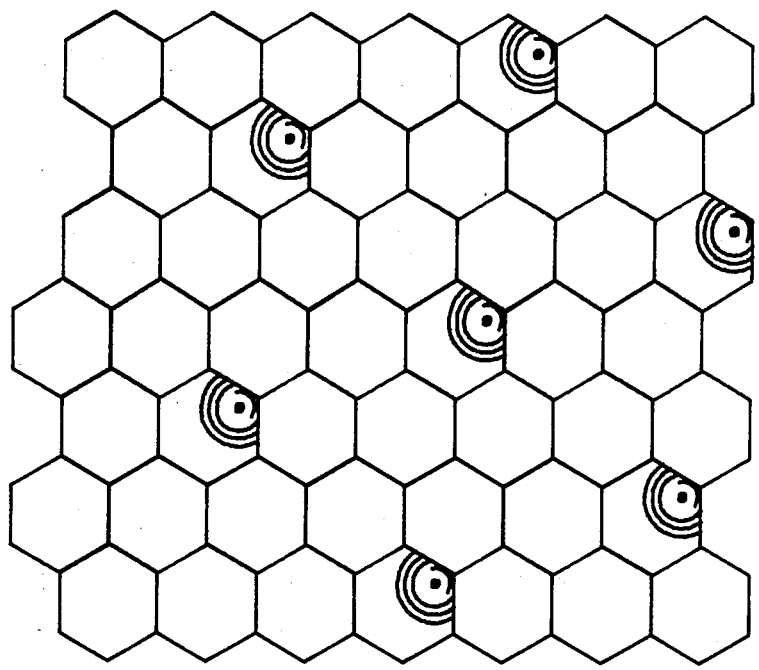
—PRIOR ART—
*FIG.2*
*FIG.3*
—PRIOR ART—
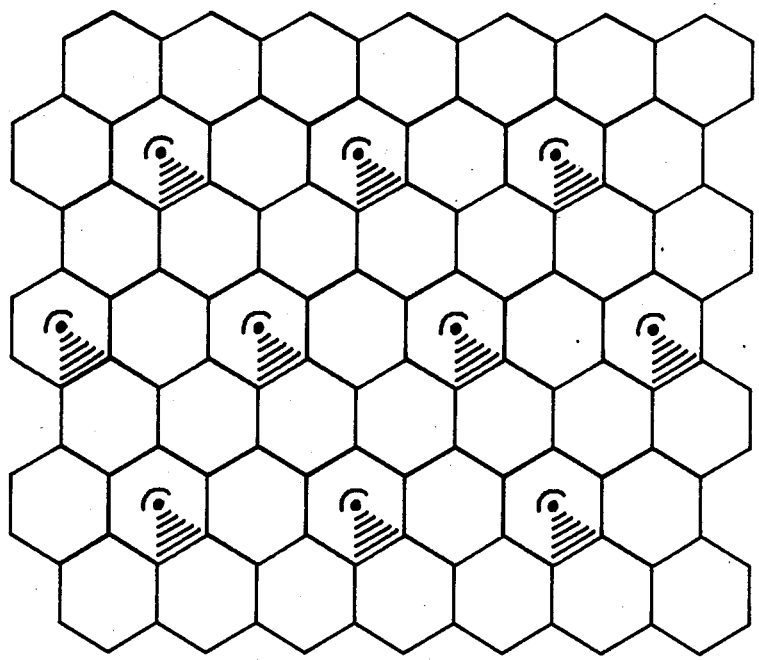

— PRIOR ART —

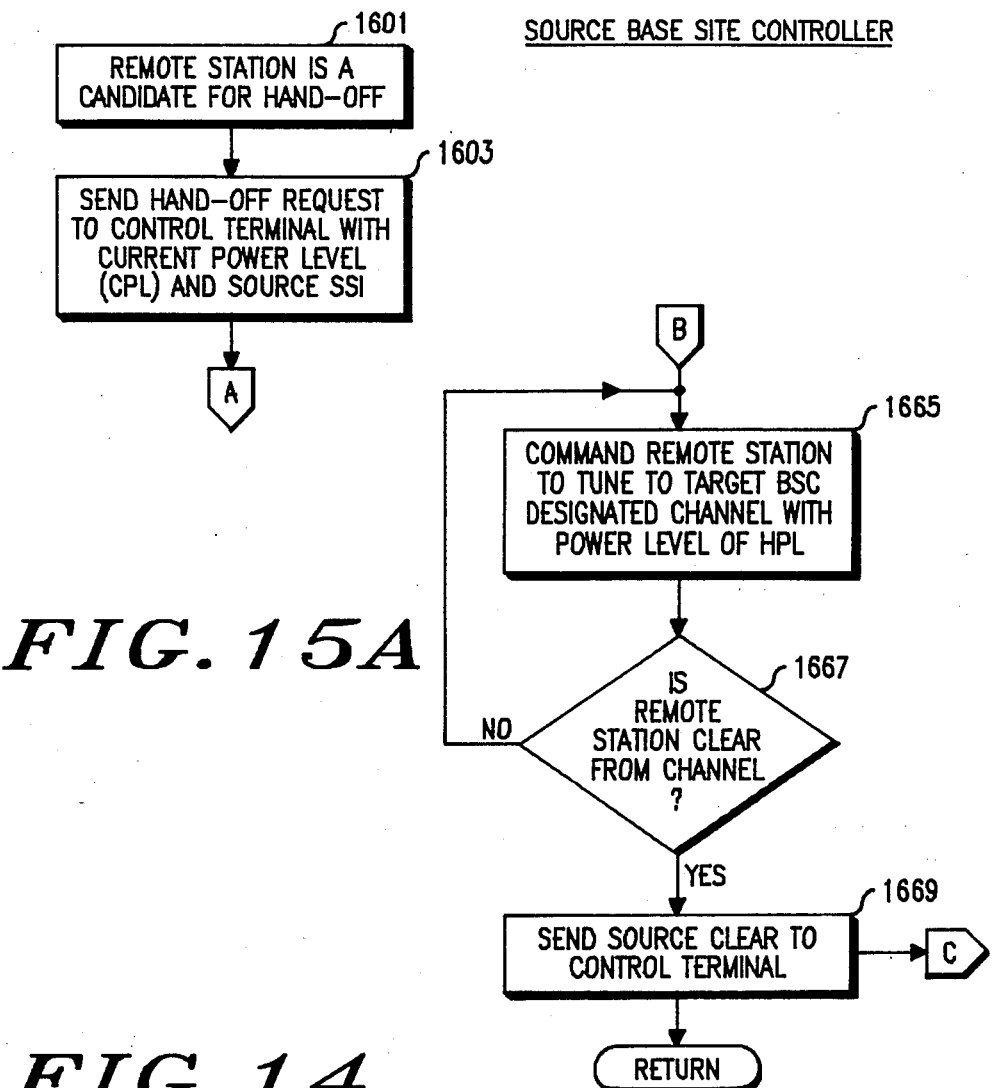

4,696,027

HANDOFF APPARATUS AND METHOD WITH INTERFERENCE REDUCTION FOR A RADIO SYSTEM

BACKGROUND OF THE INVENTION

The present invention generally relates to radiotelephone communication systems and more specifically relates to a method and apparatus for reducing the potential interference from a mobile or portable radiotelephone after being handed off from one cell to another in a cellular radiotelephone system.

Mobile radiotelephone service has been in use for some time and traditionally has been characterized by a central site transmitting with high power to a limited number of mobile or portable units in a large geographic area. Mobile or portable transmissions, due to their lower transmission power, were generally received in previous systems by a network of receivers remotely located from the central site and the received transmission was subsequently returned to the central site for processing. In previous systems only a limited number of radio channels were available, thus limiting the number of radiotelephone conversations in an entire city to the limited number of channels available.

Modern cellular radiotelephone systems have a comparatively large number of radio channels available which, further, can be effectively multiplied by reuse of the channels in a metropolitan area by dividing the radio coverage area into smaller coverage areas (cells) using low power transmitters and coverage restricted receivers. Such cellular systems are further described in U.S. Pat. Nos. 3,906,166; 4,485,486; and 4,549,311, each assigned to the assignee of the present invention. The limited coverage area enables the channel frequencies used in one cell to be reused in another cell geographically separated according to a predetermined plan, such as a seven cell repeating omnidirectionally illuminated cell pattern shown in FIG. 1. In this pattern, radio frequency energy is transmitted from and received by a plurality of centrally located fixed stations and reuse of frequencies is accomplished in a pattern of cells such as that shown shaded in FIG. 1.

An alternative cellular pattern, FIG. 2, depicts a corner illuminated cell system in which 120° antennas are employed to illuminate the interior of a cell from three of the vertices of a hexagonal cell. (Although cell systems are conventionally shown as regular hexagonal patterns, such regularity is rarely achieved in practice).

Another pattern, FIG. 3, depicts a center illuminated cell system in which the cells are further subdivided into sectors. The sectors are illuminated by 60° antennas as illustrated in FIG. 3. A center illuminated sector cell system is further described in U.S. Pat. No. 4,128,740 and assigned to the assignee of the present invention. Thus, a large number of channels can be made available in a metropolitan area and the service provided thereby can appear to be identical to a standard wire line telephone.

A cell system typically utilizes one duplex frequency pair channel in each cell (a signalling channel) to receive requests for service from mobiles and portables, to call selected mobiles or portables, and to instruct the mobiles or portables to tune to another channel where a conversation may take place. This signalling channel is continuously assigned the task of receiving and transmitting data to control the actions of the mobile and portable radios. If the cell is sectorized as shown in FIG. 3, specialized receivers have been developed to enable the inputs from six 60° antennas to be combined for instantaneous reception over the sectorized cell coverage area. One such specialized receiver is described in U.S. Pat. No. 4,369,520 assigned to the assignee of the present invention.

Since the cells may be of relatively small size, the likelihood of a mobile or portable travelling between sectors or out of one cell and into another cell is high. The process of switching the established call from one sector or from one cell to another is known as handoff. Handoff generally requires specialized receiving equipment such as a "scanning" receiver which can be instructed to tune to any of the channels in use in any of the sectors of the cell to measure the signal strength of each active mobile or portable. If the measured signal strength is below a predetermined level, cellular control equipment determines the availability of other channels in other sectors of the same cell or in neighboring cells and composes an instruction to the mobile or portable commanding it to tune to the new channel.

As cell diameters become smaller or as cellular systems become busier, the likelihood of a mobile or portable being handed off to a target cell while transmitting at a power level either too strong or too weak for the conditions in the target cell becomes greatly increased. This is complicated by the fact that in order to minimize interference on channels which are reused elsewhere in the cellular system, operational parameters are adjusted in some cells such that mobiles and portables operating in these cells are maintained at reduced power levels. Handoff thresholds are established to cause handoffs at this reduced power level from these reduced power cells while neighboring cells may be operating with full power levels and may handoff at full power level. Thus, if the transmission power level from the mobile or portable being handed off from one cell to another is not selected properly, the mobile or portable may become a source of interference to other radiotelephone subscribers operating on the same or adjacent channels

SUMMARY OF THE INVENTION

Therefore, it is an object of the present invention to reduce co-channel and adjacent channel interference by remote stations after handoff from one cell or sector to another.

It is a further object of the present invention to enable such handoff with sufficient transmission power level from the mobile or portable to maintain call quality after handoff.

Accordingly, these and other objects are encompassed by the present invention which reduces co-channel and adjacent channel interference in a multichannel two way radio system by controlling the power level of a multiple power level remote unit at handoff. A power level which will produce a predetermined received signal level from a transmitting remote station at the fixed site after handoff is calculated for a remote station transmitting to fixed site apparatus in a first radio coverage area. This power level is communicated to the transmitting remote station during a handoff of the remote station from the first radio coverage area to a second radio coverage area.

BRIEF DESCRIPTION OF THE DRAWINGS

FIG. 2 is a representation of the geographic area covered by a conventional corner illuminated cell system.

FIG. 3 is a representation of the geographic area covered by a conventional center illuminated sector cell system.

FIGS. 15A, 15B, 15C, 15D, and 15E arranged as in FIG. 16 are a flowchart illustrating the remote station handoff method of the present invention.

DETAILED DESCRIPTION OF THE PREFERRED EMBODIMENT

Figure 1:
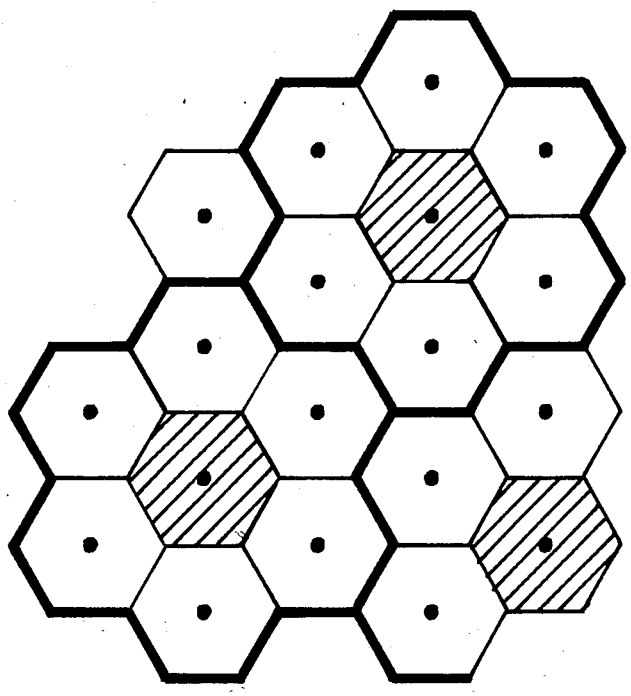
FIG. 1 is a representation of the geographic area covered by a conventional omnidirectionally illuminated cell system.
Figure 4:
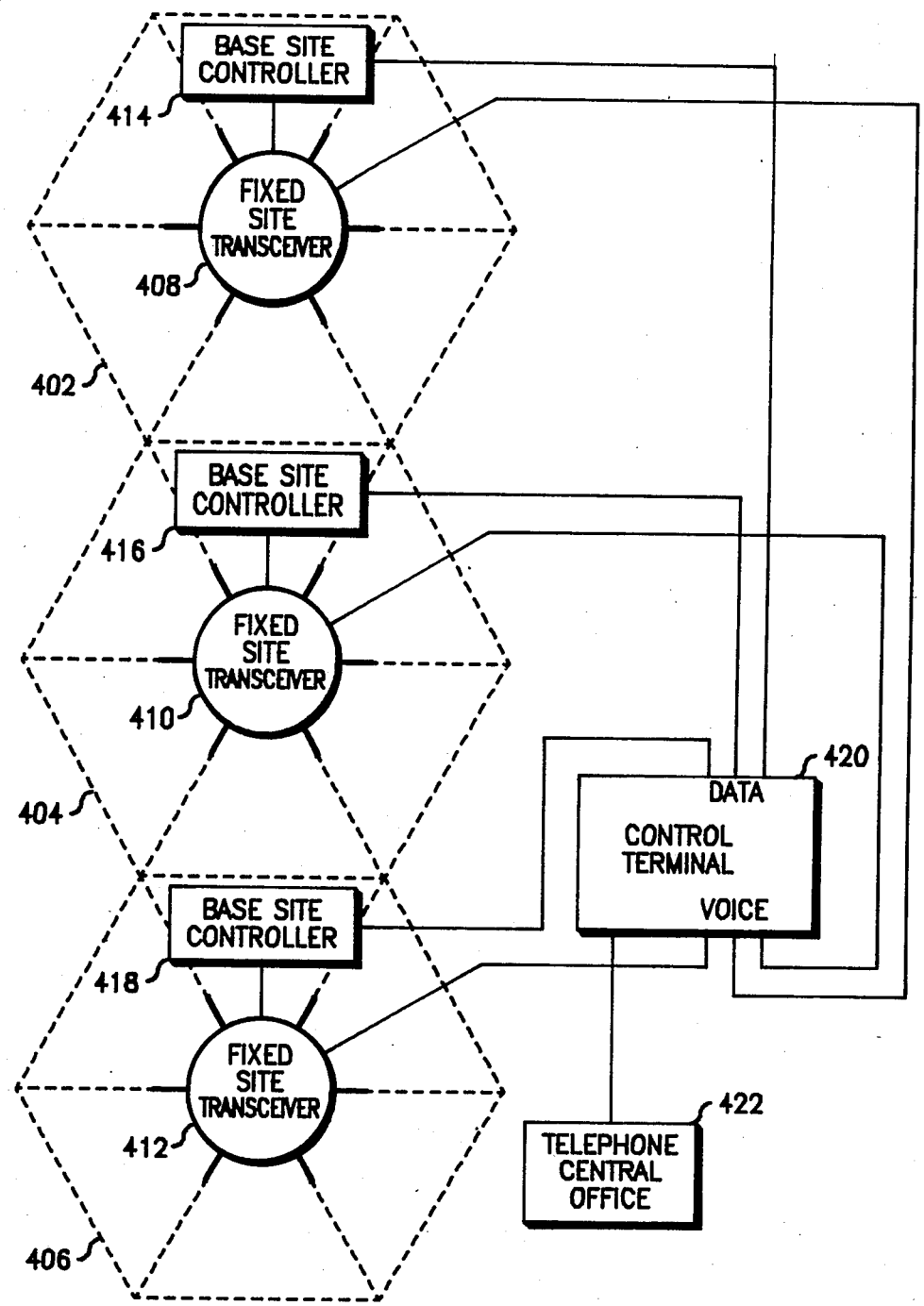
FIG. 4 is a basic block diagram of the relationships of the equipment which would be employed in a conventional center illuminated sector cell system.

Referring now to FIG. 4, there is illustrated a cellular radiotelephone communications system of the type which may particularly benefit from the invention herein described. Such a cellular communications system is further described in U.S. Pat. Nos. 3,663,762, 3,906,166; in an experimental cellular radiotelephone system application with the Federal Communications Commission by Motorola and American Radio-Telephone Service, Inc., in Feb. 1977; and more recently in a system description entitled "Motorola DYNATAC Cellular Radiotelephone Systems", published by Motorola, Inc., Schaumburg, Ill., in 1982. Such cellular systems provide telephone coverage to both mobile and portable radiotelephones located throughout a large geographical area. Portable radiotelephones may be of the type described in U.S. Pat. Nos. 4,486,624; 3,962,553; and 3,906,166 and each assigned to the assignee of the present invention; and mobile radiotelephones may be of the type described in Motorola instruction manual number 68P81039E25, published by Motorola Service Publications, Schaumburg, Ill., in 1979. The illustration of FIG. 4 shows three center illuminated sector cells of the type previously described in conjunction with FIG. 3 but with more detail regarding the type of equipment to be found in a sector cell system. Although the present invention will be described with particularity for the center illuminated sector cell system, it is obvious that a person skilled in the art may be able to apply the essence of the present invention to other types of cellular configurations such as those shown in FIG. 2 and FIG. 1.

As illustrated in FIG. 4, the geographical area is subdivided into cells 402, 404, and 406 which are illuminated with radio frequency energy from fixed site transceivers 408, 410, and 412, respectively. The fixed site transceivers may be controlled by base site controllers 414, 416, and 418 as illustrated. These base site controllers are each coupled by data and voice links to a radiotelephone control terminal 420 which may be similar to the terminals described in U.S. Pat. Nos. 3,663,762; 3,764,915; 3,819,872; 3,906,166; and 4,268,722. These data and voice links may be provided by dedicated wire lines, pulse code modulated carrier lines, microwave radio channels, or other suitable communication links. Control terminal 420 is, in turn, coupled to the switched telephone network via a conventional telephone central office 422 for completing telephone calls between mobile and portable radiotelephones and landline telephones.

Figure 5:
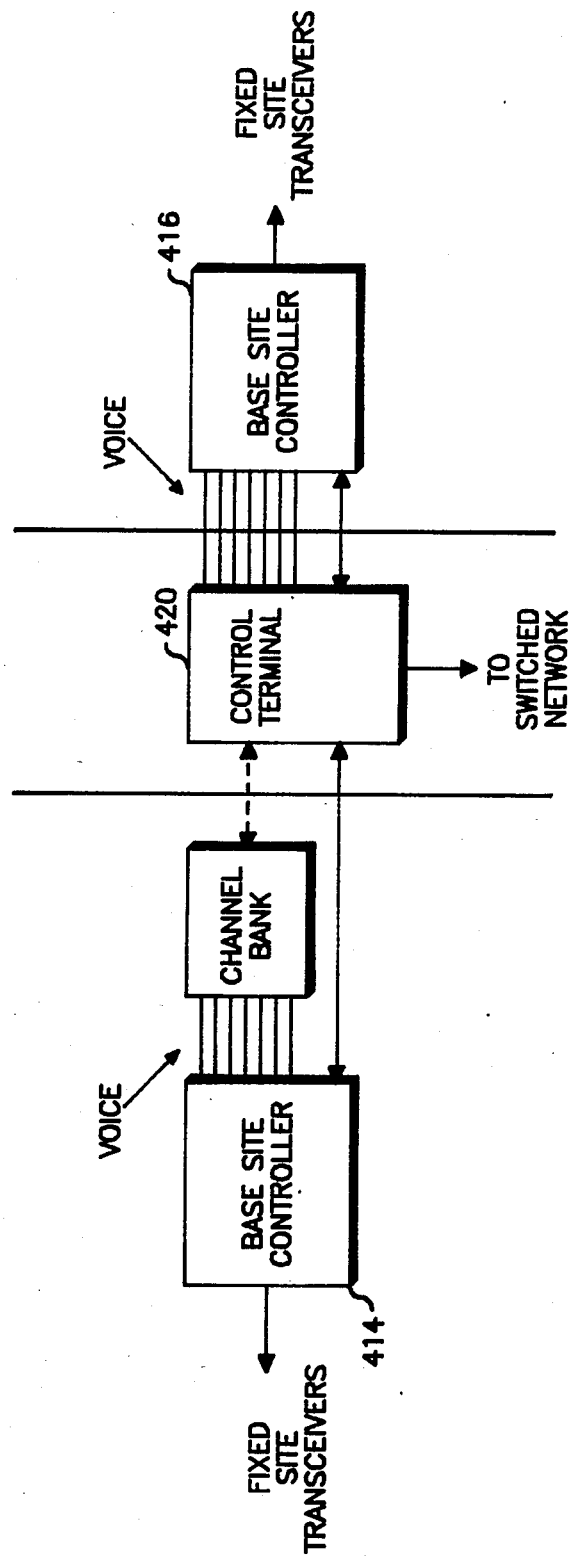
FIG. 5 is a block diagram of the interconnection between a control terminal and the base site controllers of a conventional cell system.

The interconnection between control terminal 420 and the base site controllers (BSCs) is further shown in FIG. 5. The interconnection may be on a line per channel basis such as shown between control terminal 420 and BSC 416 or the interconnection may be on a PCM group basis such as shown between control terminal 420 and BSC 414. Either type of interconnection is well known in the art. A separate data line (which may be a standard telephone line or other communications link capable of carrying 4800 baud data) is extended between the control terminal 420 and each BSC under its control.

Figure 6:
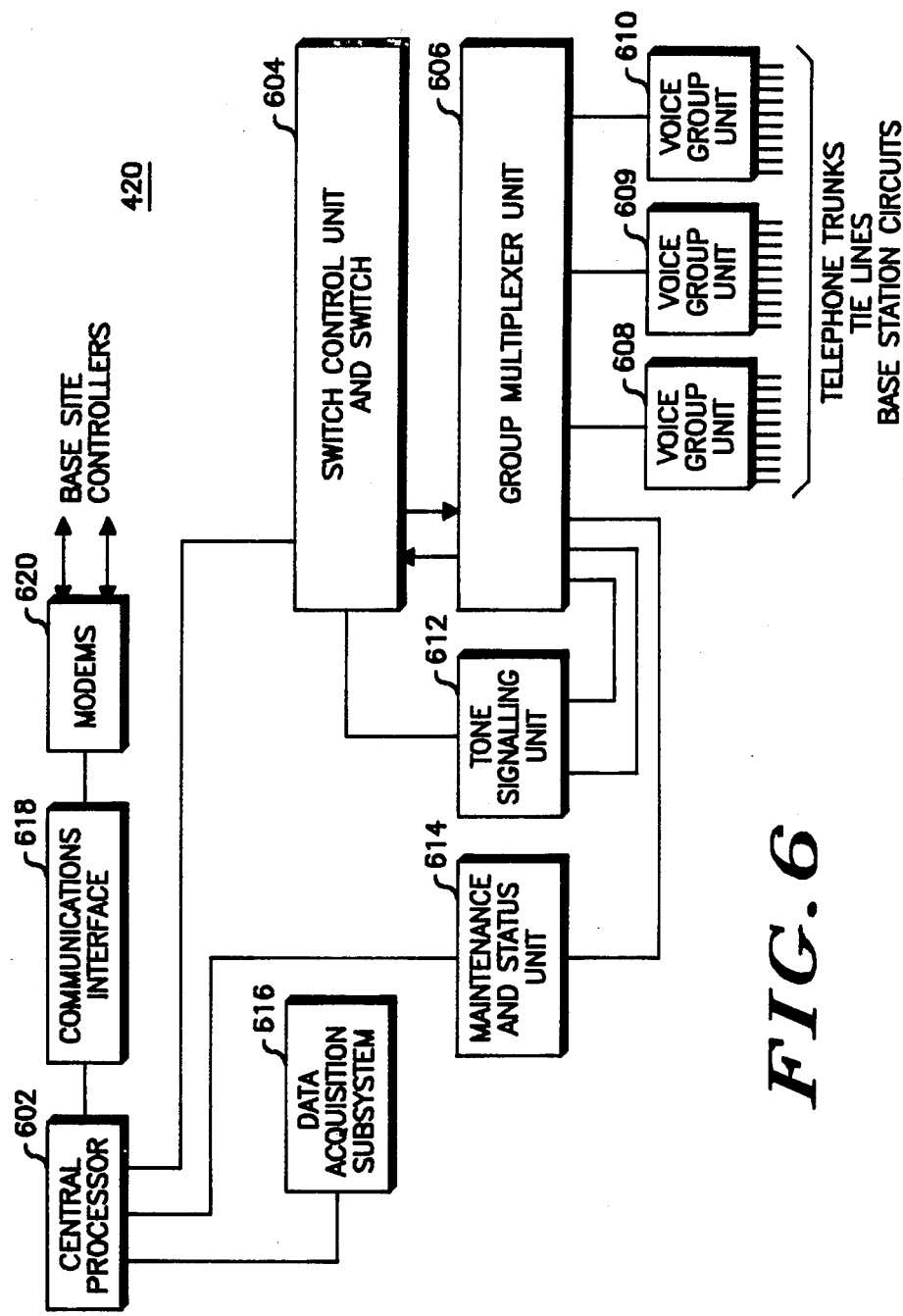
FIG. 6 is a block diagram of a conventional control terminal for a cell system.

A functional block diagram of a typical control terminal 420 is shown in FIG. 6. This control terminal may be an EMX100 available from Motorola, Inc., a plurality of such terminals, or suitable equivalents. Basically, the control terminal consists of a central processor 602, a switch control unit and switch 604, group multiplexer unit 606, voice group units 608 through 610, tone signalling unit 612, maintenance and status unit 614, data acquisition subsystem 616, communications interface 618, and BSC modems 620. Communications with the BSC may be accomplished via conventional 4800 bit per second modems.

Each of the fixed site transceivers 408, 410, and 412 includes a plurality of transmitters and receivers for operating on at least one duplex signalling channel and a plurality of duplex voice channels. One conventional system employs transmitters and receivers of the type described in Motorola Instruction Manual No. 68P81060E30, published by Motorola Service Publications, Schaumburg, Ill. in 1982. Fixed site transceivers 408, 410, and 412 are located substantially at the center of each of the corresponding cells 402, 404, and 406. The fixed site transmitters may be combined onto one omni-directional antenna, while the fixed site receivers may be intercoupled to two or more directional or omni-directional sector antennas. Alternatively, the transmitters may also be coupled to two or more directional antennas. In FIG. 4 the fixed site transceivers 408, 410, and 412 each include six 60° sector antennas. Each sector antenna primarily covers a portion of a cell and typically has a coverage area that overlaps the coverage area of adjacent sector antennas. Since the signalling channel generally requires an omni-directional receiving pattern, the signals received by the six sector antennas may be combined by a maximal ratio predetection diversity combiner, as illustrated and described in the present assignee's U.S. Pat. No. 4,369,520 Ser. No. 268,613, filed on June 1, 1981, entitled "Large Dynamic Range Multiplier for a Maximal-Ratio Diversity Combiner" invented by Frank J. Cerny, Jr., now abandoned. Furthermore, coverage of a portion of a cell may be provided by combining the signals received by two or more of the sector antennas. The sector antennas and associated receiving apparatus may be of the type described in U.S. Pat. Nos. 4,101,836 and 4,317,229.

Figure 7:
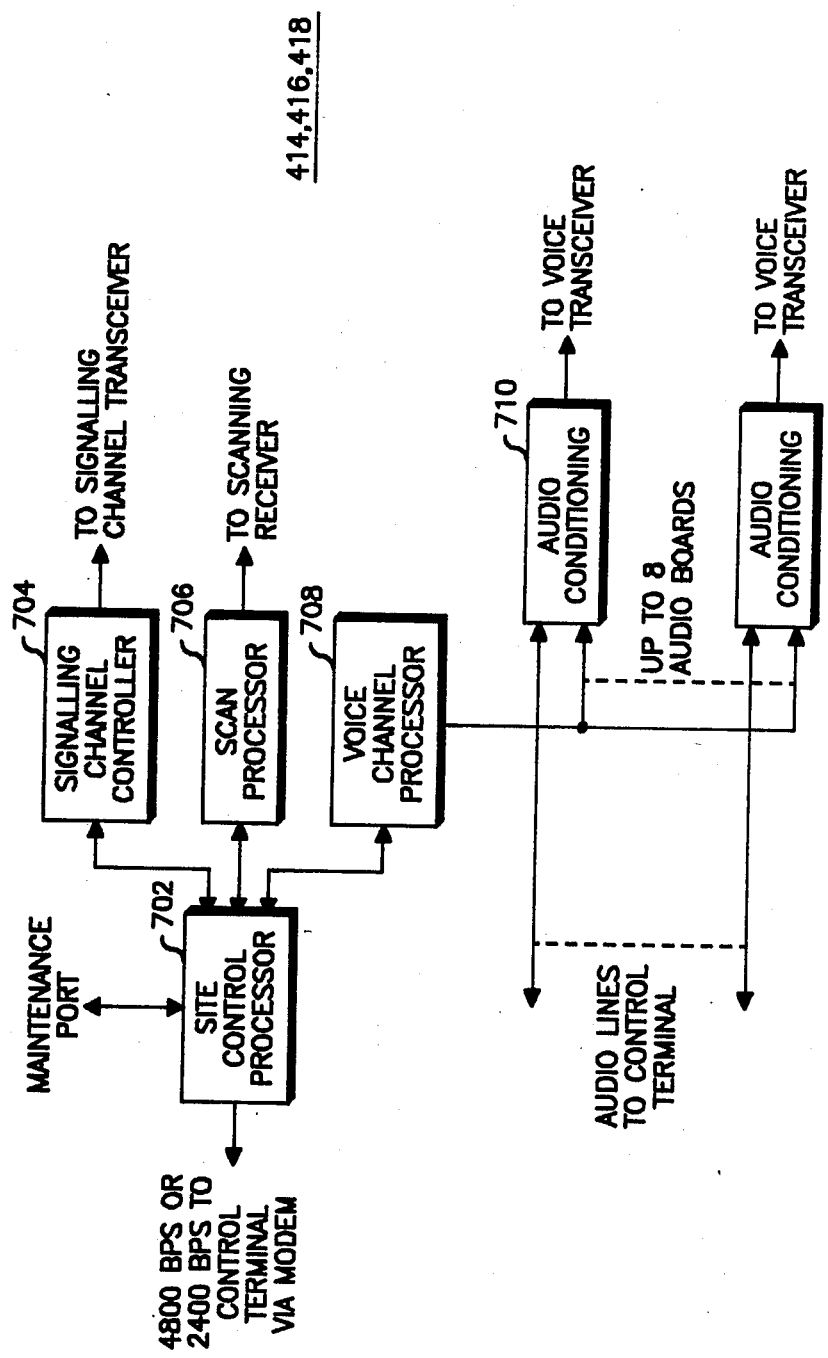
FIG. 7 is a block diagram of a conventional base site controller which may be employed in a cell system.

A conventional base site controller (414, 416, or 418) is shown in more detail in the block diagram of FIG. 7. The base site controller (BSC) provides two-way subscriber remote station (mobile and portable) signalling, voice communications, and complete control and performance monitoring of the fixed site equipment. The BSC employed in the preferred embodiment consists of a site control processor module 702 which controls all aspects of the base site operation. The site control processor 702 contains memory storage buffers for communication with the peripheral processors 704, 706 and 708. The site control processor 702 also contains serial interface ports for communicating with other site control processors and for communicating with the control terminal 420 and an RS-232 port for connection to a maintenance terminal. A signalling channel controller peripheral 704 sends paging and overhead messages to remote stations via the signalling channel by command of the site control processor 702. The signalling channel controller 704 also decodes and corrects data received from remote stations. In systems using sector receive antennas, it uses information from a signalling channel receiver to make an initial estimate of the remote stations's location.

The scan processor peripheral 706 measures every active remote station signal strength on each receive antenna. A method and apparatus for measuring signal strength on receive antennas is further described in U.S. Pat. No. 4,485,486, assigned to the assignee of the present invention. It also measures the supervisory audio tone (SAT) frequency of remote stations to verify that it is making measurements on the correct remote station. The scan processor 706 is capable of directing a scanning receiver to any system frequency and measuring any of the three supervisory audio tone frequencies. The voice channel processor peripheral 708 controls up to eight voice channel intermediate frequency amplifiers and the remote stations using them. The voice channel processor 708 interfaces to each voice channel receiver through an audio conditioning board 710. The voice channel processor 708 sends messages to remote stations by command of the site control processor 702 and further decodes and corrects data messages from remote stations over the appropriate voice channel. The voice control processor 708 controls voice transmitters and voice channel receive antenna selection. The audio conditioning boards 710 are employed one for each voice channel in use at a fixed site. The audio conditioning boards 710 conditions and controls the audio for connection to both the receiver and transmitter radio equipment and the telephone lines to the control terminal 420.

In order to determine whether or not a mobile or portable radiotelephone leaves one cell, e.g. 404, and enters another, e.g. 402 or 406, the signal strength of the mobile or portable radiotelephone must be monitored by the base site controller 416. When the signal strength of a mobile or portable radiotelephone becomes too weak, the receiving sector antenna may be changed, or the strength of the mobile or portable transmitted signal may be increased by a control signal transmitted from the base site controller 416, or the mobile or portable radiotelephone can be handed off to a base site controller 414 or 418 in another cell or sector. Handoff involves transferring the particular mobile or portable radiotelephone from a duplex voice channel in one cell to a duplex voice channel in another cell. The signal strength for each operating mobile and portable radiotelephone can be quickly and accurately measured by utilizing the invention described in the aforementioned U.S. patent application Ser. No. 405,123 (corresponding to PCT application No. 83/01180) so that corrective action can be taken before communications are degraded or interrupted due to weak signal conditions. Furthermore, as a mobile or portable radiotelephone moves closer to a fixed site transceiver 408, 410, or 412, the strength of the RF signal received at the fixed site transceiver receiver from the mobile or portable radiotelephone increases and can cause interference with other communications. Accordingly, when the signal strength of a mobile or portable remote station becomes too large, a base site controller can sense a control signal to the particular mobile or portable remote station causing it to reduce the strength of its transmitted signal. A supervisory signalling scheme and apparatus therefore that provides for such control signals is described in U.S. Pat. Nos. 3,906,166; 4,025,853; 4,029,900; 4,302,845; and 4,312,074 and the references cited therein.

Figure 8:
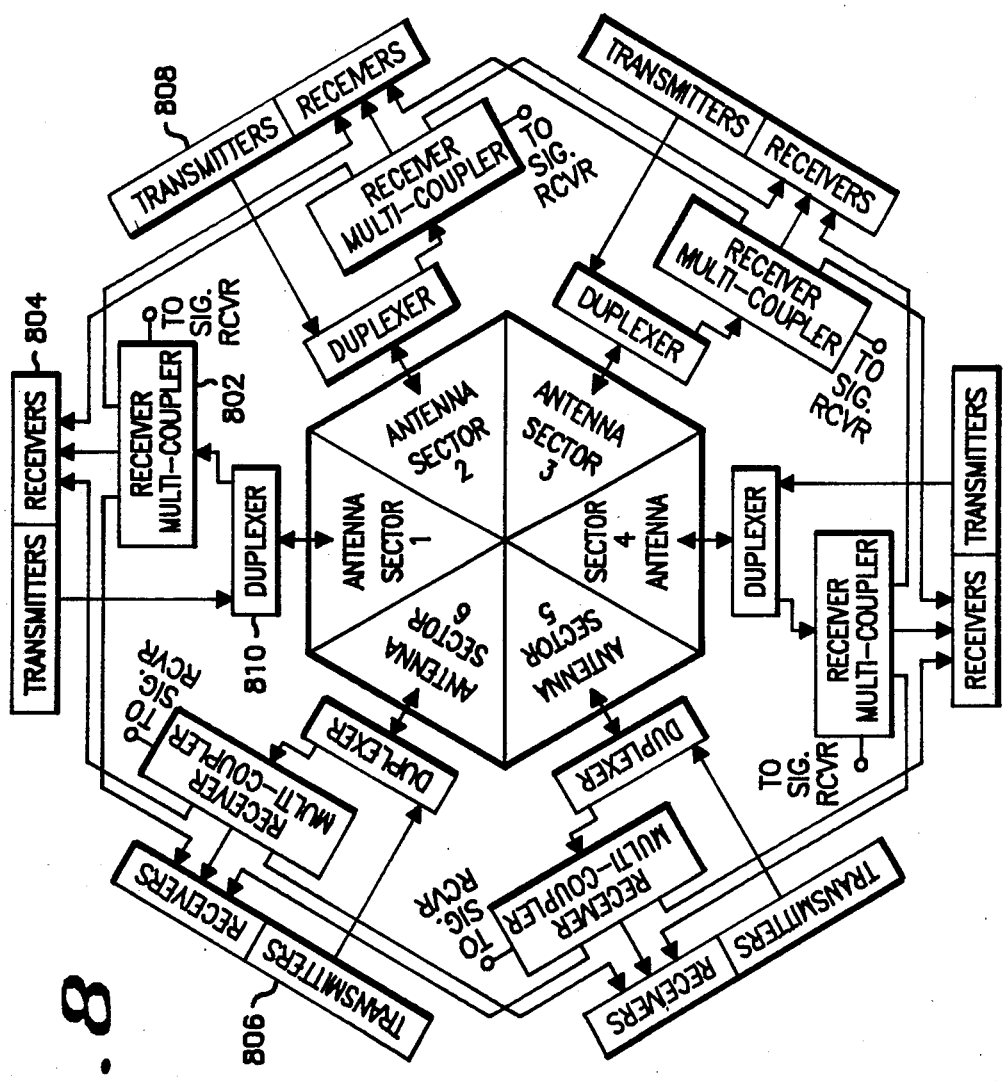
FIG. 8 is a block diagram of antenna interconnection in a center illuminated sector cell system which may advantageously utilize the present invention.

In one implementation of the present invention realizing sectorized cells, the radio transceivers are connected to the sector antennas as shown in FIG. 8. Each sector antenna is fed by a multicoupler (for example, RX multicoupler 802) to the primary transceiver equipment dedicated to the particular sector (for example, transceivers 804) and to both the adjacent sector transceiver equipment (for example, transceivers 806 for sector 6 and transceivers 808 for sectors 2). In addition, each sector antenna is coupled to a signalling receiver allowing the signalling receiver to have access to all six sector antennas. The transmitters of the primary transceiver equipment is coupled to the sector antenna via a duplexer (such as duplexer 810). The duplexers may be similar to model ACD-2802-AAMO manufactured by Antenna Specialists Co., Cleveland Ohio.

Figure 9:
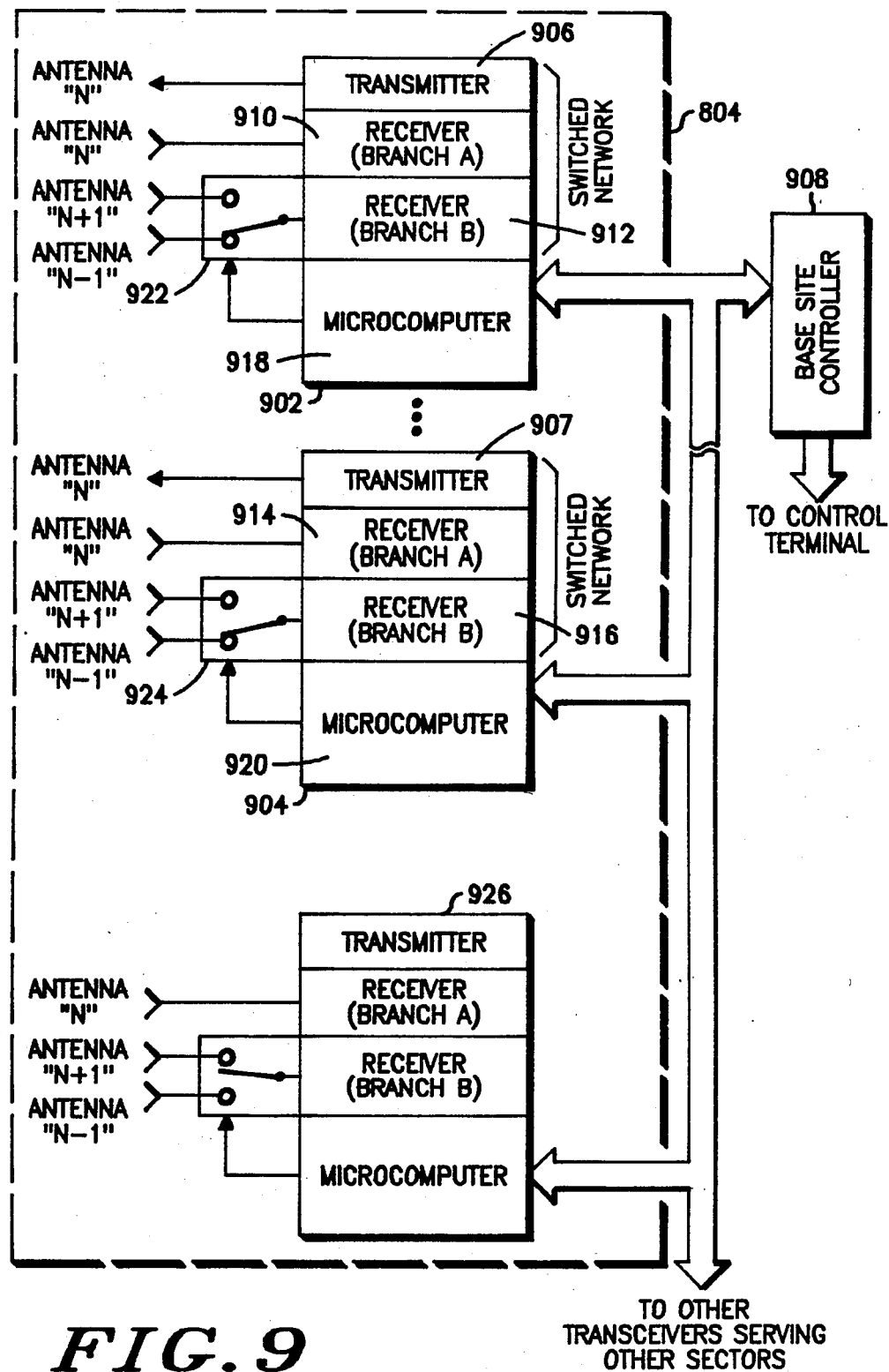
FIG. 9 is a block diagram of transceiver and base site controller interconnection in a cell system which may benefit from the present invention.

The interconnection of the fixed site transceivers to the antenna system and to the base site controller is shown in FIG. 9. In this configuration a transceiver (such as transceiver 902 or transceiver 904) consists of a transmitter 906 and 907 respectively, diversity receivers 910 and 912 (for transceiver 902) and diversity receivers 914 and 916 for transceiver 904. Each transceiver also comprises a microcomputer (918 and 920, respectively) and a sector switch (922 and 924, respectively). Additionally, an identical transceiver may be used as a scan receiver by employing the diversity receivers and the microcomputer as shown for transceiver 926. (The transmitter for transceiver 926 is not used).

Concentrating on the interconnections of transceiver 902, it can be seen that transmitter 906 and receiver (branch A) 910 are coupled to the same primary antenna (via the duplexer 810 and receiver multicoupler 802 to antenna 1 as shown in FIG. 8). Receiver (branch B) 912 is coupled to left and right adjacent sectors via sector switch 922 (which from FIG. 8 are antenna 6 and antenna 2). The output bus from the BSC 908 is connected to each of the microcomputers of the transceivers at a cell site. In the transceivers of the present invention, the transmitter 906 input and receivers 910 and 912 output are connected directly to the switched network without the requirement of being routed back to the control terminal 420 as done in previous implementations. Control of the interconnection to the control terminal 420 is achieved by microcomputer 918 via control signals from the BSC 908.

A more detailed description of the system interconnection and of the transceivers which may be employed by the present invention may be found in U.S. patent application Ser. No. 830,145 "Improved Cellular Radiotelephone Land Station" filed on behalf of Atkinson et al. on Feb. 18, 1986 and assigned to the assignee of the present invention.

Figure 10:
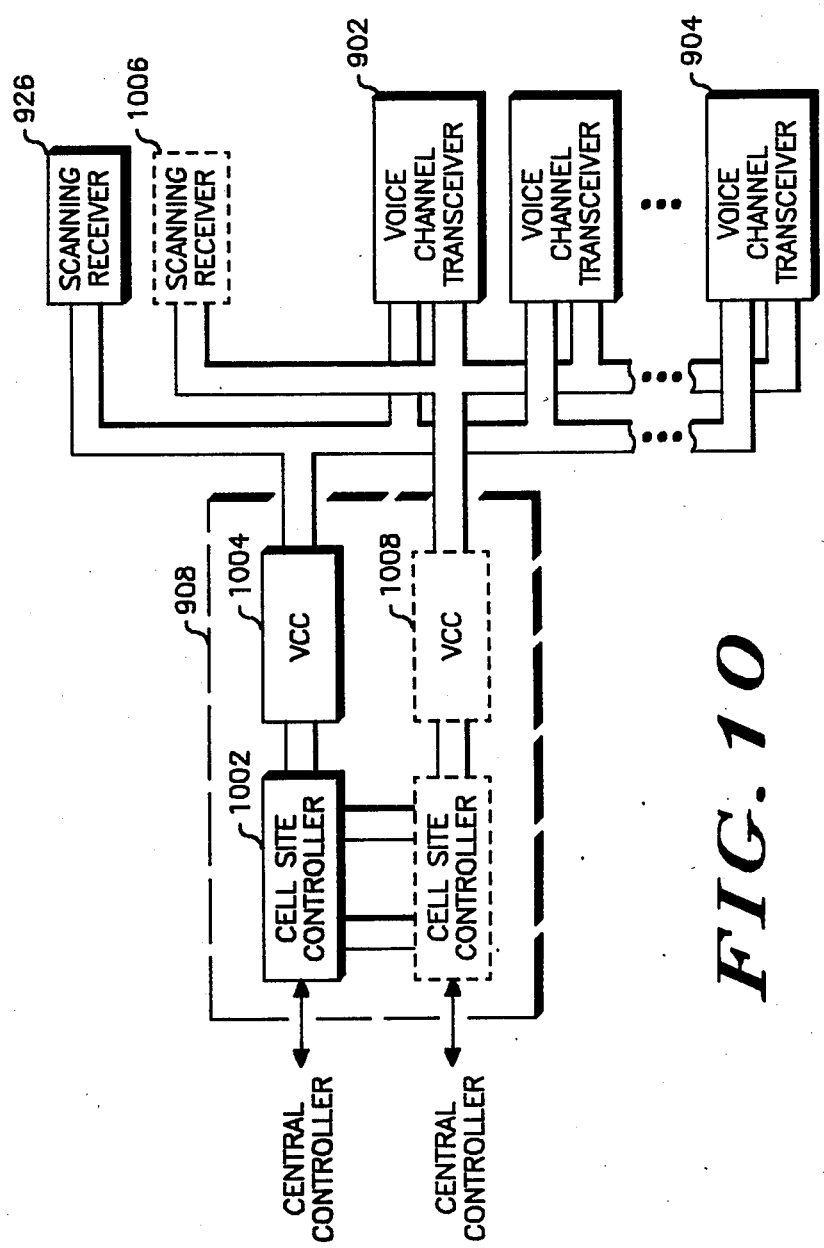
FIG. 10 is a block diagram of the base site controller which may employ the present invention.

FIG. 10 illustrates the basic block diagram of the BSC 908 and its interconnection to the transceivers in the preferred embodiment. The cell site controller (CSC) 1002 is the highest level function and coordinates all of the activities at the cell site as well as providing the interface between the cell site and the telephone central office 422 (mediated by the control terminal 420).

Figure 11:
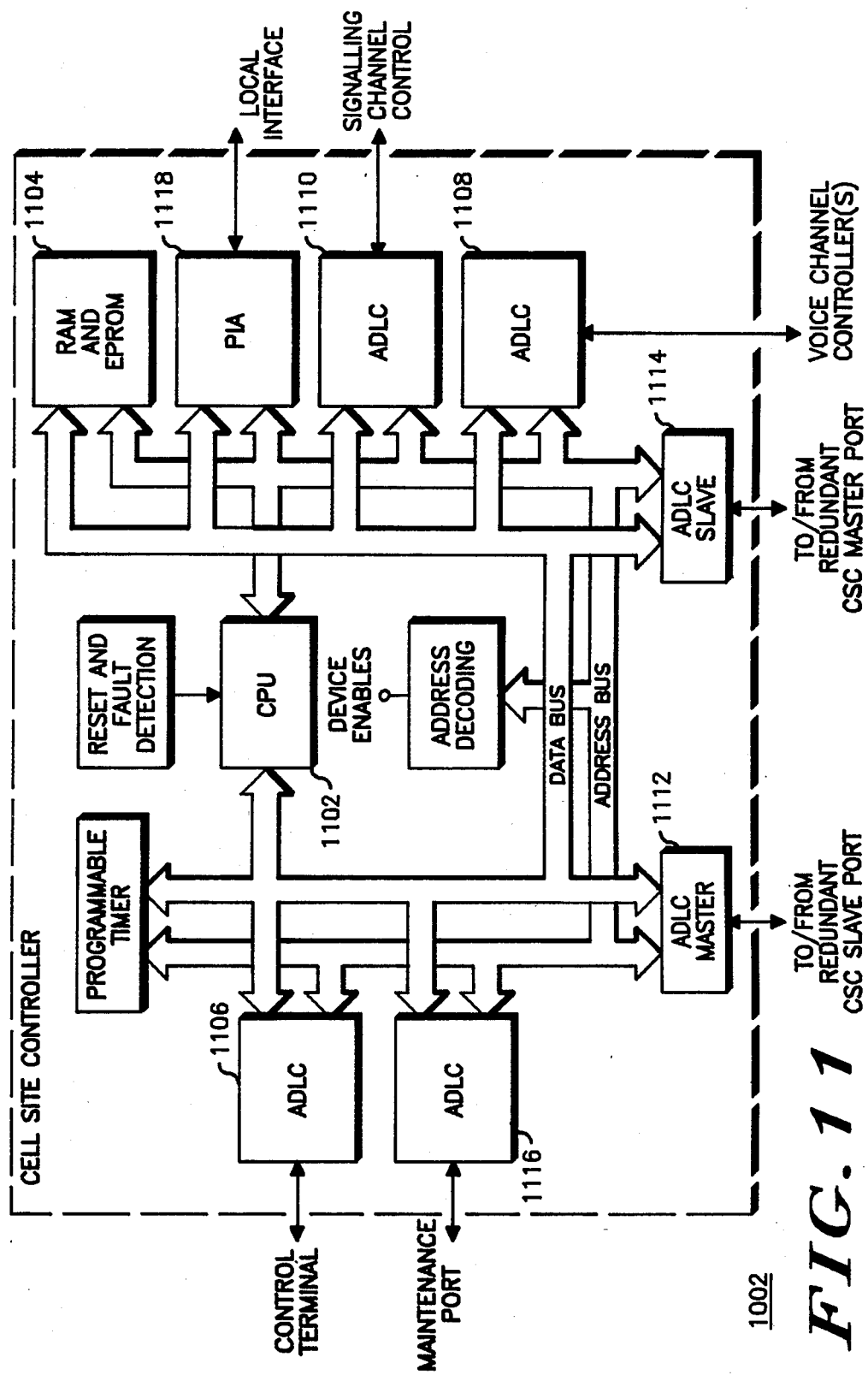
FIG. 11 is a detailed block diagram of a cell site controller (CSC) such as that which may be employed in the base site controller of FIG. 10.

A more detailed block diagram of the cell site controller (CSC) is shown in FIG. 11. A microprocessor such as an MC6809 available from Motorola, Inc., is employed as a central processing unit (CPU) 1102 which coordinates all of the activities at the cell site in accordance with an operating program stored in RAM and EPROM 1104. Six data ports are used to exchange control and status messages with the control terminal 420 (via ADLC 1106), one or more voice channel controllers (VCC's) (via ADLC 1108), signalling channel receiver control via ADLC 1110), redundant (slave) CSC and/or redundant (master) CSC (via ADLC 1112 and 1114 respectively), and a maintenance port (via ACIA 1116). All of the aforementioned serial ports in the preferred embodiment, except for the maintenance port, are bit-oriented synchronous serial data links using a version of the Advanced Data Communications Control Procedures (ADCCP) as the communications protocol. The maintenance port, used for maintenance and software loading, supports a standard asynchronous serial protocol. Additionally, a peripheral interface adapter (PIA 1118) supports auxiliary input/output which may be used as a local customer interface.

A voice channel controller (VCC) 1004 may control up to 30 voice transceivers and one scanning receiver in the preferred embodiment. A redundant VCC 1008 may be employed to provide system redundancy down to the voice channel transceiver and double the transceiver capacity. This is possible because each transceiver has two communications ports with which to communicate with two VCCs. The communications ports on the transceivers are embodied within the transceiver microcomputer itself. A signal called "XCVREN" (transceiver enable) is used by the VCC to select the port on the transceiver that will be used for communications. One VCC will control one port and a redundant "partner" VCC will control the other port. The transceiver communicates with that VCC which is currently asserting the transceiver signal. Thus it is possible for the second VCC to continue controlling a voice transceiver should the first VCC fail. It is even possible to reconstruct call activity as the call processing and maintenance state of the voice transceiver is continuously being updated.

Figure 12:
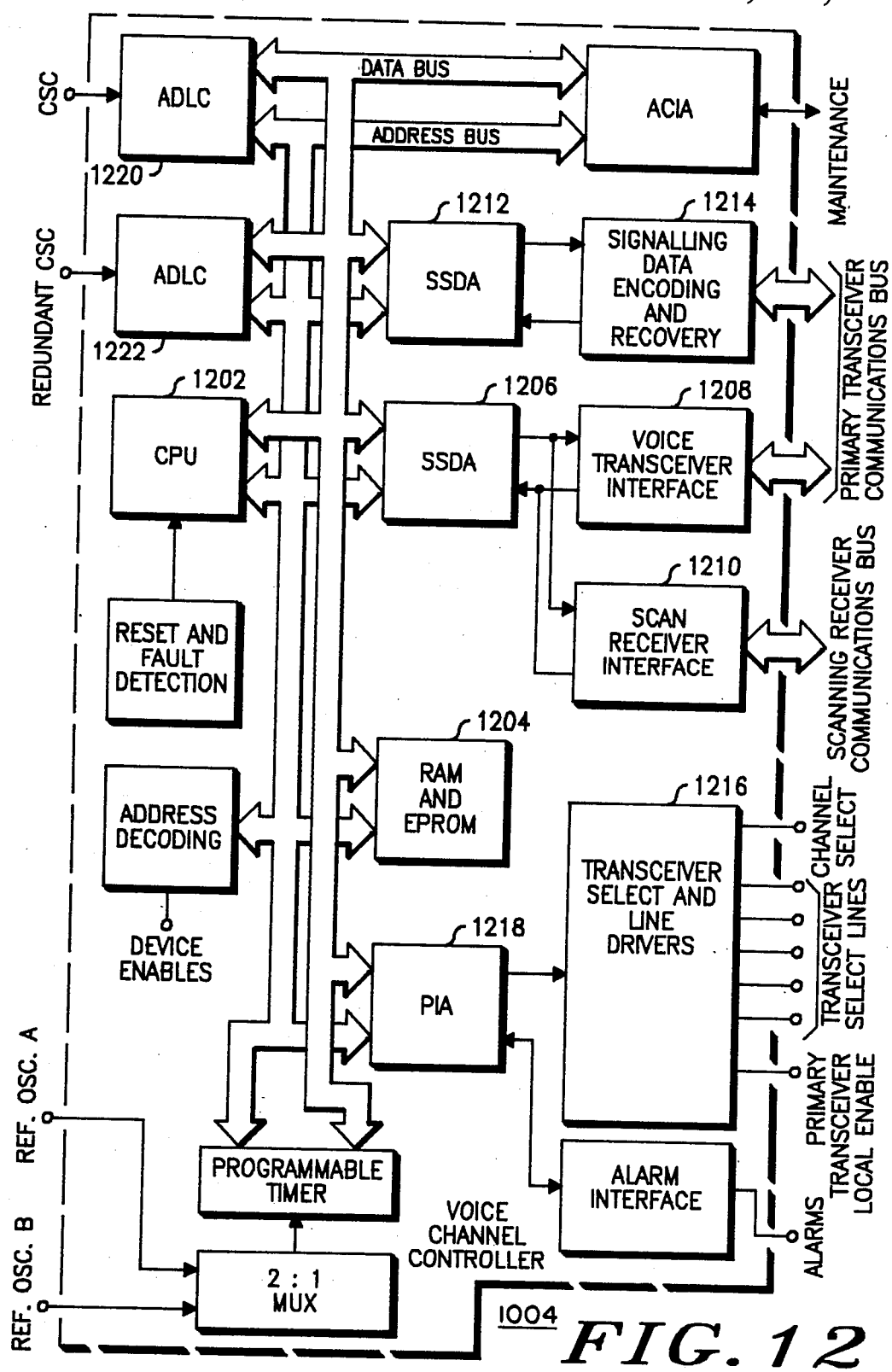
FIG. 12 is a detailed block diagram of a voice channel controller (VCC) such as that which may be employed in the base site controller of FIG. 10.

A detailed block diagram of a voice channel controller (such as VCC 1004) which may be employed in the present invention is shown in FIG. 12. The central processing unit (CPU 1202) may be a microprocessor such as MC6809 available from Motorola, Inc. This CPU 1202 is used to control the cell site voice channel transceivers and scanning receiver(s) in accordance with programmed steps stored in RAM and EPROM 1204. In a nonredundant configuration of the present invention, VCC 1404 may control up to 30 channels of radio equipment and one scanning receiver employing SSDA 1206, voice channel transceiver interface 1208, and scanning receiver interface 1210. Signalling data encoding and decoding is controlled via SSDA 1212 and signalling encoding and recovery interface 1214. Transceivers are selected by select logic and line driver circuit 1216 which is controlled by CPU 1202 via peripheral interface adaptors (PIA 1218). In the redundant configuration requiring two VCCs, each transceiver (being dual-ported) can communicate with both VCCs. Under normal operating conditions, each VCC actively controls half of the channels while exchanging control and status messages with the other half. Interface with the master CSC (if present) via ADLC 1222.

Referring to FIGS. 13A, 13B, 13C and 13D as arranged in FIG. 14, there is illustrated a flow chart embodying the channel assigning and scanning methods of the present invention such as may be found in U.S. Pat. No. 4,485,486; U.S. patent application Ser. No. 829,872 "Method and Apparatus for Signal Strength Measurement and Antenna Selection in Cellular Radiotelephone Systems" filed on behalf of Menich et al. on Feb. 18, 1986; and U.S. patent application Ser. No. 830,166 "Scanning Receiver Allocation Method and Apparatus for Cellular Radiotelephone Systems" filed on behalf of Menich et al. on Feb. 18, 1986, all of which are assigned to the assignee of the present invention. Entering the channel assigning portion of the flow chart as START block 1402 in FIG. 13A, program control proceeds to block 1404 where the voice channel controller microprocessor 1202 in FIG. 12 of a base site controller 908 monitors the signalling channel for channel request signals from mobile or portable radiotelephone states. If no such remote station requests a channel, NO branch is taken from decision block 1406 to block 1414. Otherwise, YES branch is taken from decision block 1406 to decision block 408 where it is determined whether or not this cell has frequency reuse. Cells which are sufficiently geographically separated can both utilize the same frequency radio channels. If this cell has frequency reuse, YES branch is taken to block 1412 where a channel from a first group of radio channels is assigned to a requesting remote station. For example, assuming each reuse cell has the same set of channels each having different RF signal frequencies and being assigned the same number in each reuse cell, the first group of channels in one of the reuse cells may be even numbered channels, while the first group of channels in the other reuse cell may be odd numbered channels. Thus, cochannel interference between reuse channels will be minimized during conditions when only channels of the first group are used to accommodate telephone calls in the reuse cells, since both reuse cells are using different frequency channels. In order to make sure that all channels are periodically exercised, the even/odd channel pattern may be changed once per hour in the reuse cells If a cell does not have reuse, NO branch is taken from decision block 1408 to block 1410 where channels are sequentially assigned on a round robin basis to requesting stations.

Figure 13A:
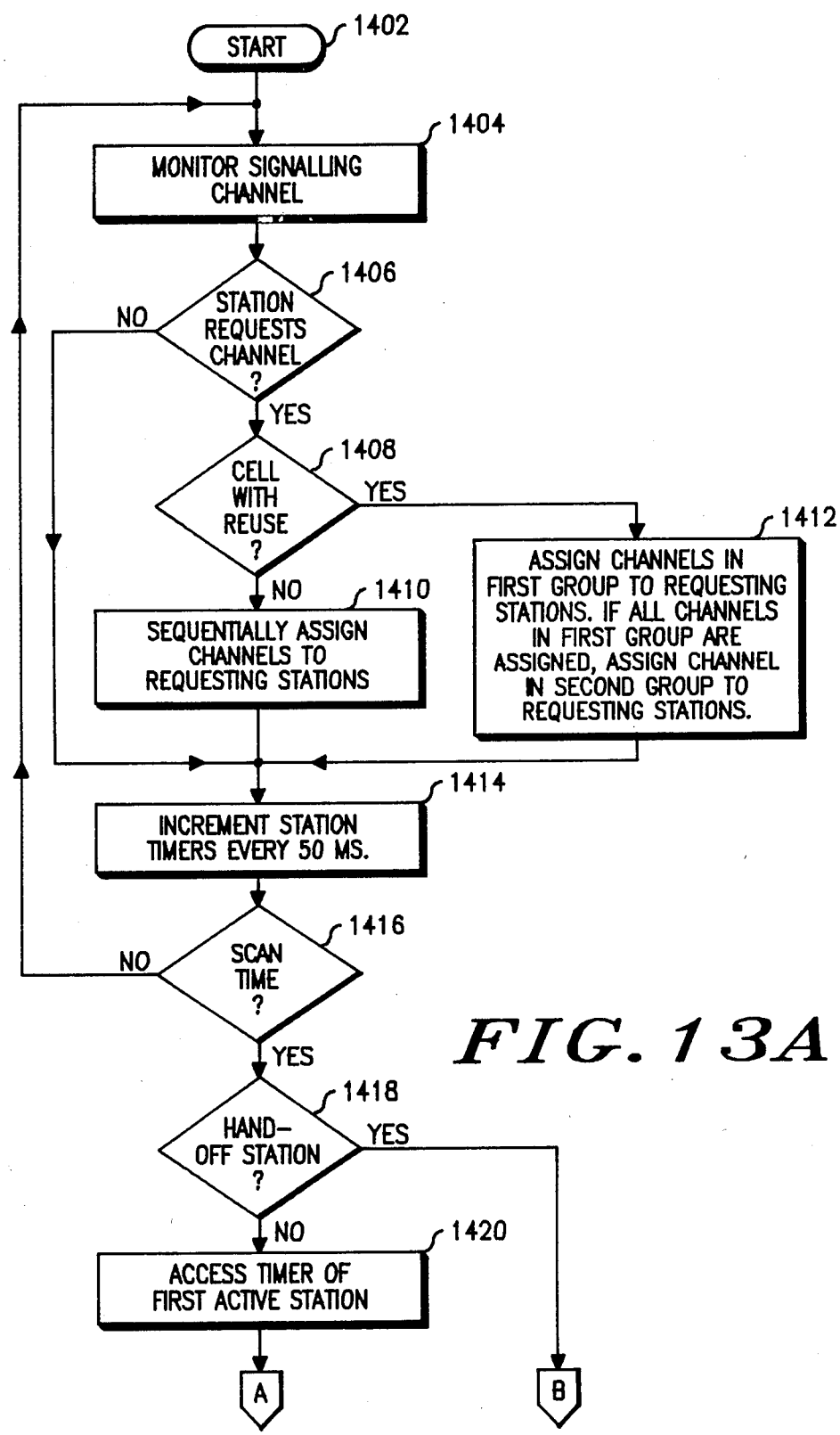
FIGS. 13A, 13B, 13C and 13D arranged as in FIG. 14 are a flowchart illustrating the channel assigning and scanning method of the present invention.

Next, at block 1414 in FIG. 13A, timers associated with each active remote station are incremented by one every predetermined time interval, such as, for example, every fifty milliseconds. The station timers indicate how long it has been since the last time the corresponding remote station was scanned to determine its signal strength. Therefore, the station timers can be monitored to determine whether or not any action must be taken to avoid degradation in communications with the active remote stations. Next, at decision block 1416, it is determined whether or not it is time to scan the active remote stations. The active remote stations must be scanned at periodic intervals to insure that each active station has adequate signal strength to provide good voice communications. The time interval between scanning active remote stations depends on a number of things, including the time it takes scanning receiver 926 in FIG. 10 to tune to the frequency of a selected station, the time it takes the scanning receiver to switch to another sector antenna, the number of signal strength samples taken for each sector antenna, and the time between taking each signal strength sample. The time between scans may be selected to approximately 350 milliseconds or a convenient variable time between scans for each cell in most radiotelephone communications systems. If it has not been 350 milliseconds since the last scan for example, NO branch is taken from decision block 1416 back to block 1404 to resume monitoring of the signalling channel for channel request signals. Assuming it has been 350 milliseconds or more since the last scan, YES branch is taken to block 1418 where the scanning portion of the flow chart is entered.

The scanning method employed in the present invention quickly and efficiently takes signal strength measurements on each sector antenna for a selected remote station, and, on the basis of the measured signal strength, either takes no further action, or changes sector antennas, or raises or lowers the power of the signal transmitted from the selected remote station, or generates a request to handoff the selected remote station to another cell so as to optimize its signal strength for good voice communications. Parameters utilized by the scanning method can be varied in each cell in order to optimize voice communications in a particular radiotelephone communications system. For example, parameters may be utilized to set the minimum and maximum allowable signal strengths for each cell or for each sector of a cell. In other words, different cells or even different sectors of a cell may have different minimum and maximum allowable signal strength parameters. The measured signal strength of a remote station is generally referred to as the signal strength indicator or SSI. Also, parameters can be varied for determining how many out-of-range signal strength readings must have been taken before changing sector antennas, or changing the power output of a station, or handing off a remote station to another cell. For example, when the signal strength (SSI) of a selected remote station is below the minimum allowed level, an attempt may first be made to change the sector antenna used in the receiver of the voice transceiver assigned to the selected remote station. If no other sector antenna is receiving a stronger signal from the selected station, or changing sector antennas did not result in a signal strength greater than the minimum allowed signal strength, then an attempt may be made to increase the power output of the selected remote station or to hand the remote station off to another cell. The power output of the selected remote station can be increased in one or more steps between a minimum level and a maximum level. If the selected remote station is already transmitting at the predetermined maximum power level for that cell or sector and/or its signal strength (SSI) is below the minimum allowed signal strength, an attempt may be made to hand off the selected remote station to another cell. Conversely, when the signal strength (SSI) of a selected remote station exceeds the maximum allowable signal strength, the power output of the selected remote station may be reduced in one or more steps to reduce the possibility of interference to other remote stations on the co- or adjacent channel or to prevent overloading of the receiver in the voice transceiver assigned to the station.

Each time the scanning portion of the flow chart in FIG. 13A is entered at block 1418, one active remote station is processed. Handoff remote stations are given priority over all other active remote stations since handoff remote stations are most likely already outside of the cell that is presently servicing it. Therefore, at decision block 1418, a check is made to determine whether a request has been received from the central control terminal 420 to scan a handoff remote station. If so, YES branch is taken to block 1454 in FIG. 13C in order to measure the signal strength of the hand-off remote station. The sector antenna receiving the strongest signal from the hand-off remote station is identified in blocks 1454, 1456 and 1458. Next, at decision block 1460, a decision is made whether or not to proceed with the handoff process. If YES, the handoff process continues as will be described later.

Returning back to decision block 1418 in FIG. 13A, if there are no hand-off requests, NO branch is taken to block 1420 where the timer of the first active remote station is accessed. Next, the portion of the flowchart starting in FIG. 13B at block 1422 essentially selects the remote station which has the largest timer indicating that the elapsed time since it was last scanned is greater than that for any other active remote station. Proceeding to decision block 1422, the accessed timer is compared to a parameter labeled SCANSU, which is a time period during which subsequent scanning is suppressed. In the preferred embodiment of the present invention, SCANSU has been selected to be several seconds. If the accessed timer is less than SCANSU, YES branch is taken to decision block 1428, where it is determined whether or not the timers for all active remote stations have been accessed and checked. If not, NO branch is taken to block 1430 where the timer of the next active remote station is accessed, and the process is repeated from decision block 1422.

Figure 13B:
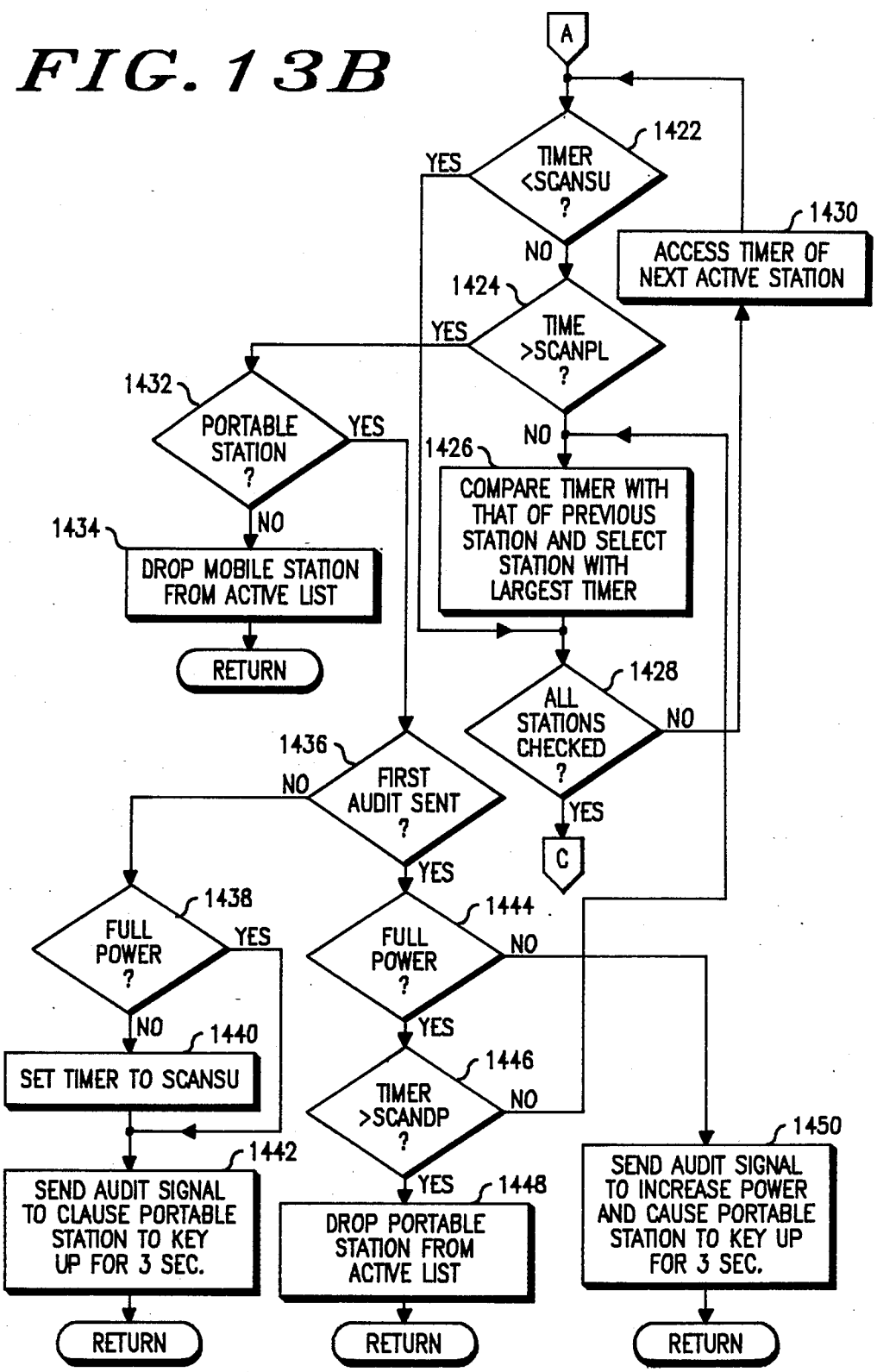

If the accessed timer is greater than SCANSU, NO branch is taken from decision block 1422 in FIG. 13B to decision block 1424, where the accessed timer is compared to a parameter labeled SCANPL. SCANPL is the maximum allowable time from the previous scan for a selected remote station. In the preferred embodiment of the present invention, SCANPL has been selected to be fourteen seconds. If the accessed timer is less than SCANPL, NO branch is taken to block 1426, where, if the corresponding remote station is still active and transmitting an RF signal, its accessed timer is compared with the previously selected timer and the larger of the two is selected. When all active remote station timers have been accessed and checked, the station selected at block 1426 is presently transmitting an RF signal and has a timer that is greater than SCANSU but less than SCANPL.

If a station timer is greater than SCANPL, YES branch is taken from decision block 1424 in FIG. 13B to decision block 1432, where it is determined whether or not the corresponding station is a portable or mobile radiotelephone. If the corresponding station is a mobile radiotelephone, NO branch is taken to block 1434 where the mobile station is dropped from the list of active stations and its timer is reset. Since mobile stations transmit continuously when in use, the most likely reason that a mobile station timer will exceed SCANPL is that the mobile station's transmitted signal has become too weak to be received at the fixed site, or that the mobile station has dropped the call because the fixed site transmitted signal has become too weak for the mobile to receive.

If the corresponding remote station is a portable station, YES branch is taken from decision block 1432 in FIG. 13B to decision block 1436, where it is determined whether or not the portable station has been sent an audit signal. Portable stations with voice operated transmit (VOX) pose an additional problem for a radiotelephone communications system since portable stations may appear to be inactive when, in fact, the portable station user is just listening. Therefore, when the timer for a portable station exceeds SCANPL, an audit signal may be sent to the portable to cause it to transmit for a predetermined time interval, such as, for example, three seconds. Then, while the portable station is transmitting its signal strength can be measured to determine if any action is necessary to maintain the quality of communications.

If a first audit signal has not been sent, NO branch is taken from decision block 1436 in FIG. 13B to decision block 1438, where it is determined whether or not the corresponding portable station is operating at full power. If so, YES branch is taken to block 1442 where an audit signal is sent by microprocessor 1202 in FIG. 12 by way of the assigned voice transceiver 902 or 904 to the corresponding portable station commanding it to transmit for a three second time interval. If the portable unit was not at full power, NO branch is taken from decision block 1438 to block 1440 where the timer for the corresponding portable station is set to be equal to SCANSU. The portable station timer is set back SCANSU to insure that the portable station will be scanned during one of the succeeding scans. After the portable station timer is set SCANSU at block 1440, and audit signal is sent to the portable station at block 1442 to cause the portable station to transmit for three seconds, so that the portable station transmitter will be on for approximately the next nine scan periods.

If a first audit signal has been sent to the corresponding portable station, YES branch is taken from decision block 1436 in FIG. 13B to decision block 1444, where it is determined whether or not the portable station is at full power. If the portable station is not at full power, NO branch is taken to block 1450 where an audit signal is sent to the portable station causing it to increase its power output and key up for a three second time interval. The audit signal can cause a portable station to increase its power output in one or more steps until full power is reached. The size and number of the steps can be varied depending on the requirements of a particular radiotelephone communications system.

If a portable station is already at the maximum power permitted for that cell sector, YES branch is taken from decision block 1444 in FIG. 13B to decision block 1446, where it is determined whether or not the timer for the portable station is greater than the parameter SCANDP. SCANDP is the maximum allowable time from a previous scan for portable station timers. In one embodiment employing the present invention, SCANDP has been selected to be twenty-one seconds. If a portable station timer is greater than SCANDP, YES branch is taken to block 1448 where that particular portable station is dropped from the list of active stations and its timer is reset. Thus, portable stations that have not been transmitting for a time interval in excess of SCANDP will be considered to be lost and their telephone call will be terminated. If a portable station timer is not greater than SCANDP, NO branch is taken from decision block 1446 back to block 1426, where the portable station timer is selected if it is larger than a station timer previously selected at block 1426 and the portable station is presently transmitting. This point in the flowchart is reached only if the particular portable station has been audited at least once and is transmitting at the maximum power permitted for that cell or sector.

If a RETURN block is reached before all station timers have been accessed and processed by blocks 1422, 1424, 1426, 1428 and 1430 in FIG. 13B, program control is returned to await the next scan period. If decision block 1428 is reached and all station timers have been accessed and checked, YES branch is taken to decision block 1428 is reached and all station timers have been accessed and checked, YES is taken to decision block 1452 in FIG. 13C, where it is determined whether or not an active, transmitting remote station had been selected in block 1426. If a remote station was not selected, NO branch is taken and program control returns to await the next scan period. If a remote station has been selected, YES branch is taken from decision block 1452 to block 1454 to begin the process of measuring the signal strength of the selected remote station. As previously explained, block 1454 may also be reached from decision block 1418 in FIG. 13A if a handoff request has been received.

Figure 13C:
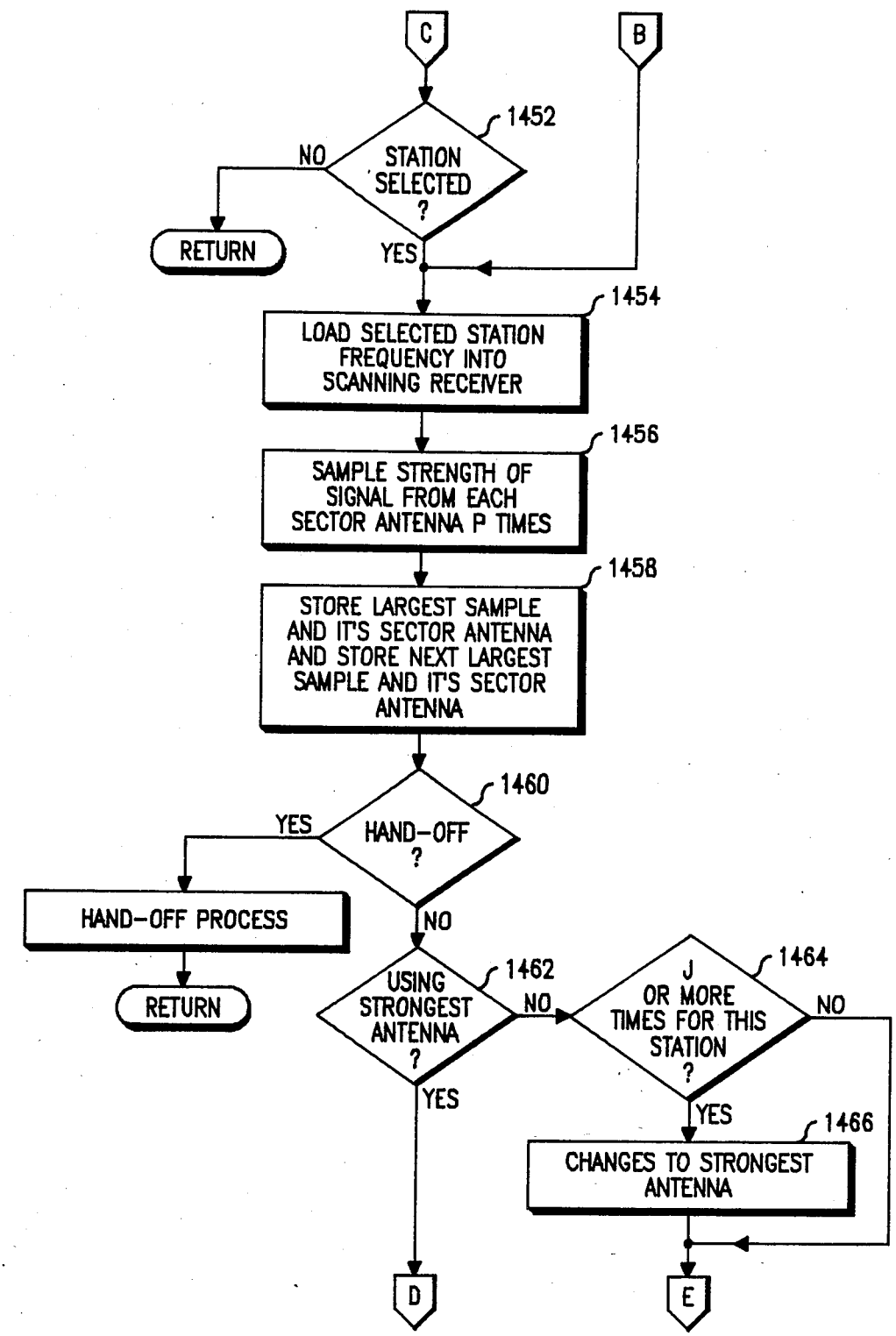

Next, at block 1454 in FIG. 13C, scanning receiver 928 in FIG. 10 is loaded with the frequency of the channel on which the selected station is operating. Proceeding to block 1456, the signal strength of the signal received by each sector antenna is measured P times, where P is a parameter greater than one. In the preferred embodiment, P is set to thirty-two so that thirty-two signal strength samples are taken for each of the six sector antennas. Then, at block 1458, microprocessor 1202 in FIG. 12 stores the largest signal strength (SSI) sample taken in block 1456 and its corresponding sector antenna number, and, for the remaining sector antennas, stores the next largest SSI and its corresponding sector antenna number. Next, at decision block 1460, it is determined whether or not the handoff process is to continue. If handoff is not to proceed, NO branch is taken from decision block 1460 to decision block 1462, where it is determined whether or not the voice transceiver assigned to the selected remote station is using he sector antenna receiving the strongest signal. In other words, if the sector antenna presently being used by the voice transceiver 902 or 904 in FIG. 10 assigned to the selected remote station is not receiving the strongest signal, the selected antenna coupled to the fixed site voice transceiver may be changed to improve the quality of voice communications. If the transceiver assigned to the selected remote station is not using the sector antenna having the largest SSI, NO branch is taken to decision block 1464, where it is determined if this condition has occurred J or more times, where J is a parameter greater than one. If so, YES branch is taken to block 1466 where the voice transceiver assigned to the selected remote station is switched to the sector antenna having the largest SSI. By requiring that this condition occurs J or more times, excessive switching between sector antennas is avoided. Program control proceeds from NO branch of decision block 464 and from block 1466 to block 1494 in FIG. 13D, where the timer of the selected remote station is reset to zero. The selected remote station timer is reset at block 1494 so that the particular remote station will not be scanned against until after a time interval of length SCANSU. If scans could occur too frequently, both unnecessary overhead would be created and successive signal strength readings may be too highly correlated. Therefore, the scan frequency should be high enough to ensure that any station passing through the transition region between cells at top speed would be scanned at least the M times required for hand off in block 1486 in FIG. 13D. Thus, excessive scanning is prevented through the use of the delay parameter, SCANSU, which establishes the minimum amount of time which must elapse before a remote station is eligible to be scanned again.

Figure 13D:
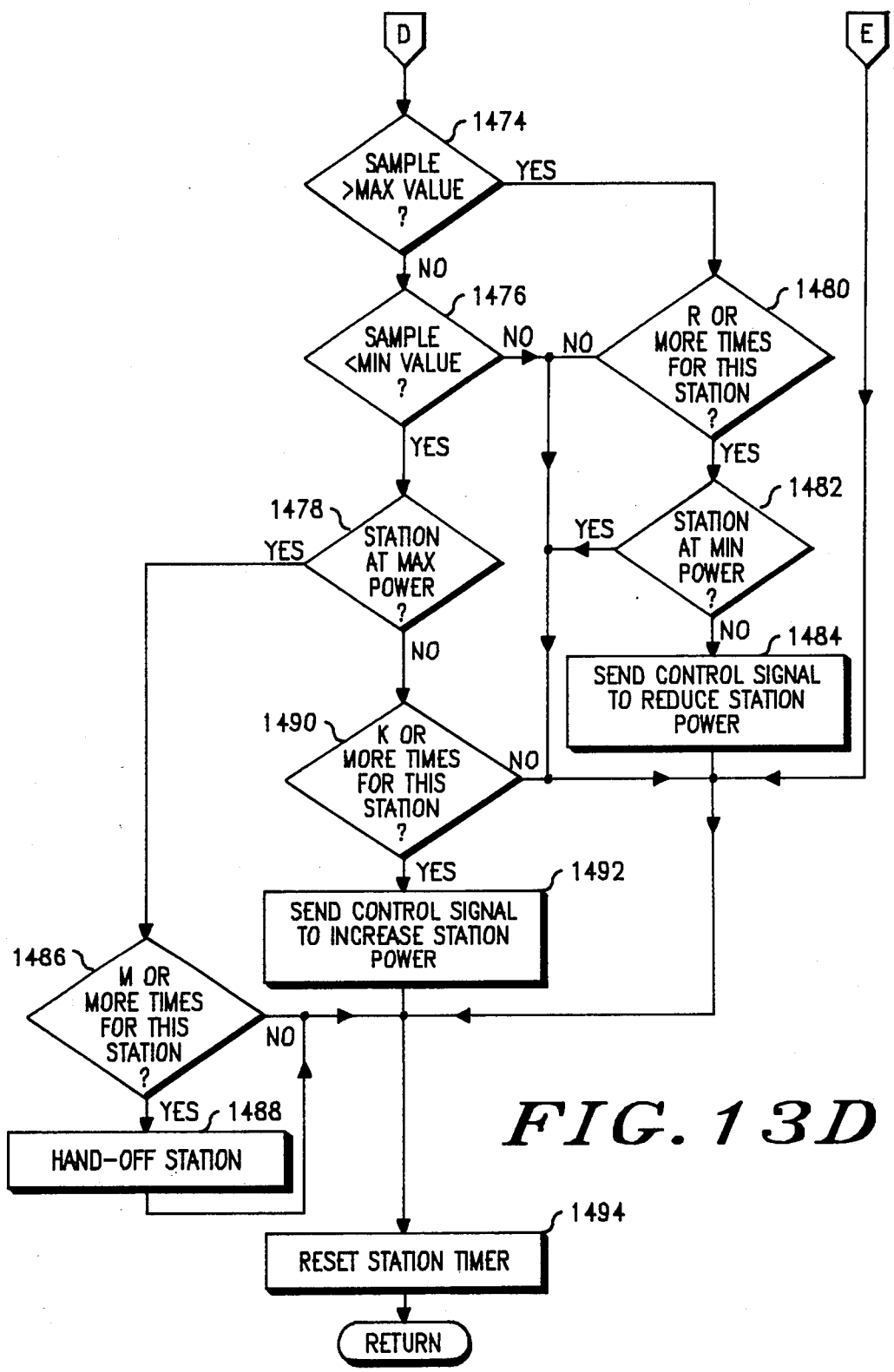

If the selected remote station is already using the sector antenna having the largest SSI, YES branch is taken from decision block 1462 in FIG. 13C to decision block 1474 in FIG. 13D, where it is determined whether the largest SSI is greater than the maximum allowable SSI. If so, YES branch is taken to decision block 1480 where it is determined whether or not this condition has ocurred R or more times, where R is a parameter greater than one. If so, YES branch is taken to decision block 1482, where it is determined whether or not the selected remote station is already at minimum power output. If not, NO branch is taken to block 1484 where a control signal is sent by microprocessor 1202 in FIG. 12 to the selected remote station commanding it to reduce its power output. The power output reduction can be taken in one or more steps until the minimum power output is reached. Program control proceeds from NO branch of decision block 1480. YES branch of decision block 1482 and from block 1484 to block 1494, where the timer of the selected remote station is reset to zero.

If the largest SSI is not greater than the maximum allowable SSI, the NO branch is taken from decision block 1474 in FIG. 13D to decision block 1476, where the largest SSI is compared to the minimum allowable SSI. If the SSI is greater than or equal to the minimum allowable signal strength, the NO branch is taken to block 1494 where the selected remote station timer is reset. Otherwise, YES branch is taken from decision block 1476 to decision block 1478, where it is determined whether or not the selected remote station is transmitting at the maximum allowable power output for that cell or sector. If the selected remote station is already transmitting at the maximum allowable power output for that cell or sector, YES branch is taken to decision block 1486, where it is determined whether or not this condition has occurred M or more times, where M is a parameter greater than one. If so, YES branch is taken to block 1488 where a handoff request is sent via control terminal 420 in FIG. 4 to other adjacent base site controllers. As will be explained later, the other adjacent base site controllers scan the handoff remote station to determine which will be selected to accept the handoff remote station. Program control proceeds from NO branch of decision block 1486 and from block 1488 to block 1494 where the selected station timer is reset.

If the selected remote station is not already transmitting at the maximum allowable power output. NO branch is taken from decision block 1478 in FIG. 13D to decision block 1490, where it is determined whether or not this condition has occurred K or more times, where K is a parameter greater than one. If so, YES branch is taken to block 1492 where microprocessor 1202 in FIG. 12 sends a control signal to the selected remote station commanding it to increase its power output. The power output can be increased in one or more steps until the maximum allowable power output for that cell or sector is reached. Program control proceeds from NO branch of decision block 1490 and from 1492 to block 1494 where the selected station timer is reset. Thereafter, program control returns to await the next scan period.

The flowchart in FIGS. 13A, 13B, 13C and 13D as arranged in FIG. 14, provide a detailed description of the process steps necessary for implementing the channel assigning and scanning method of the present invention in programmable control circuitry, such as microprocessor 1202 and its associated circuitry in FIG. 12 and microprocessor 1102 and its associated circuitry in FIG. 11. By way of analogy to an electrical circuit diagram, the detailed flow chart in FIGS. 13A, 13B, 13C and 13D is equivalent to a detailed schematic for an electrical circuit, where provision of the exact part values for the electrical components in the electrical circuit corresponds to provision of microprocessor instructions for blocks in the flow chart. Therefore, coding the process steps in the blocks of the detailed flow chart in FIGS. 13A, 13B, 13C and 13D into the appropriate instructions of a suitable conventional microprocessor is a mere mechanical step for one skilled in the art. If the Motorola MC6800 series of microprocessors is utilized for the microprocessors 1202 and 1102, programming techniques for the Motorola MC6800 series microprocessors are described in many currently available sources, including "Basic Microprocessors and the 6800" by Ron Bishop, published by the Hayden Book Company, Inc. in 1979; "Programming the 6800 Microprocessor" by Bob Southern, published by Motorola Semiconductor Products, Inc., Literature Distribution Center, Phoenix, Ariz. in 1977: and the "MC6801 8-Bit Signal-Chip Microcomputer Reference Manual", published by Microprocessor Operations, Motorola, Inc., Austin, Tex. in 1980.

As indicated earlier it is highly desirable to process remote unit handoffs in such a way that interference to other cochannel users is minimized. The unique handoff method of the present invention accomplishes this requirement, for example when one cell or one sector of a cell operates at a different transmit power level than its adjacent sector or cell. It is anticipated that the handoff process of the present invention be used in omnidirectional cells, or sectorized cells, or in combinations of different cell configurations.

The equipment used in a cellular system employing the present invention is preferably that described previously, i.e., a central control terminal coupled to a plurality of base site controllers which, in turn, are coupled to fixed site transceivers for radio communication with remote mobile and portable stations. Reconfiguration of these basic elements from the configuration shown in the preferred embodiment will not affect the scope of the invention. In considering the following method of handoff, the base site controller (BSC) currently handling an in progress telephone call requiring handoff is referred to as the source BSC. One or more other base site controllers may receive an adequate signal strength from the handoff remote station so that they may be considered as potential base site controllers to handle the telephone call after handoff. The base site controller (BSC) which is eventually chosen to continue the telephone call after handoff is designated the target BSC. It should be noted that the source BSC may be the same base site controller generating a sector to sector handoff. The entire handoff process is mediated by the control terminal.

Within each cell, and within each sector of each cell, a plurality of signal strength (SSI) thresholds are established to optimize the performance of the cell system as an entire operating entity. Among these thresholds is the handoff threshold below which a received SSI from a remote station generates the need for a handoff. Generally bracketing the handoff threshold are thresholds at which the power level of the remote station should be increased (generally below the handoff threshold) and the threshold at which the power level of the remote station should be decreased (generally above the handoff threshold). These power increase/decrease thresholds form approximately the lower and upper bounds of a nominal signal strength window and indicate the value of a nominal signal strength value (NSSI) for a particular cell or sector which is approximately the average signal strength level of the lower and upper power thresholds. The NSSI, then, is the desired signal strength at which a remote station should be received by the voice channel transceivers of the fixed site equipment.

Figure 15B:
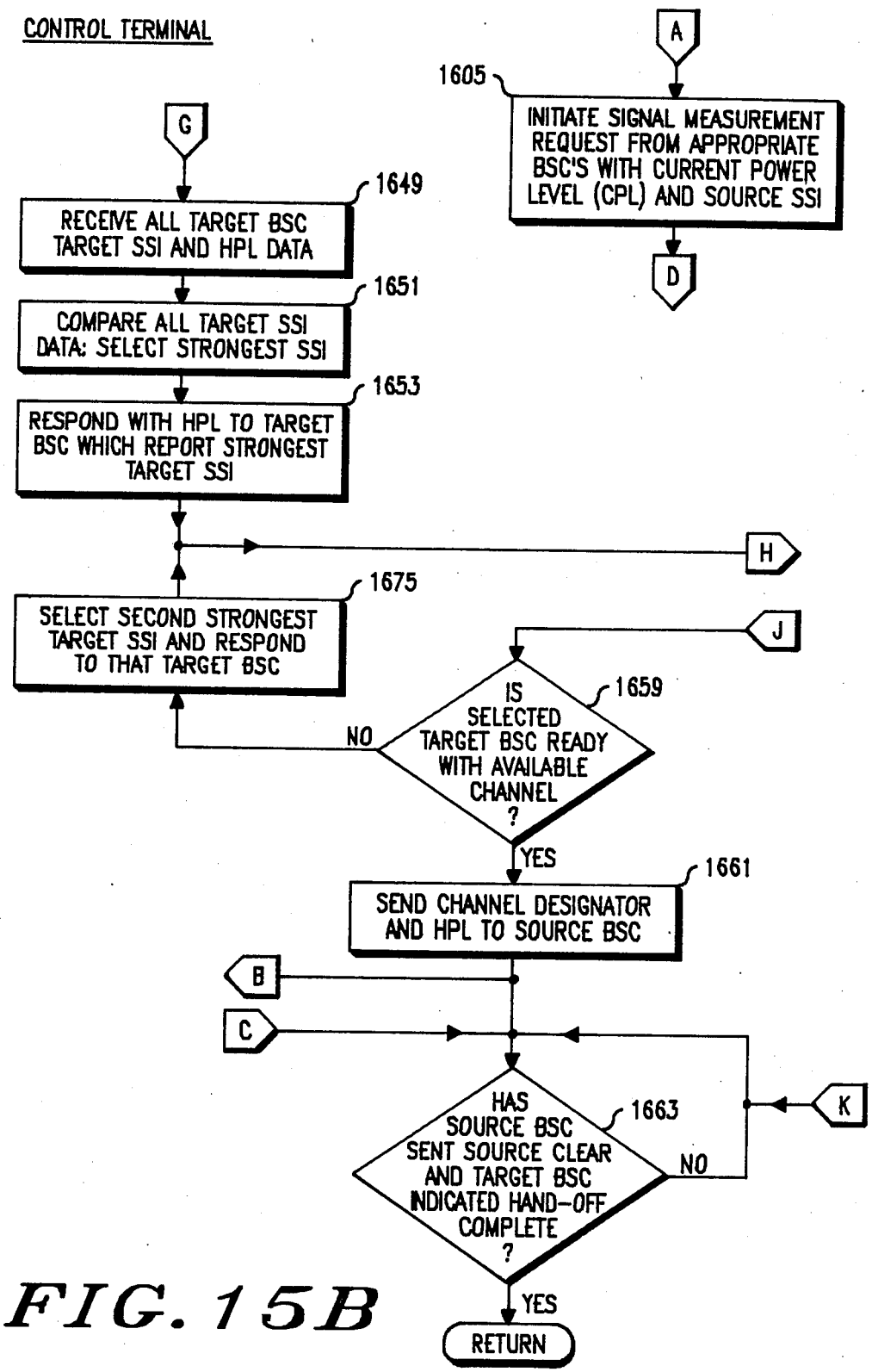
Figure 15C:
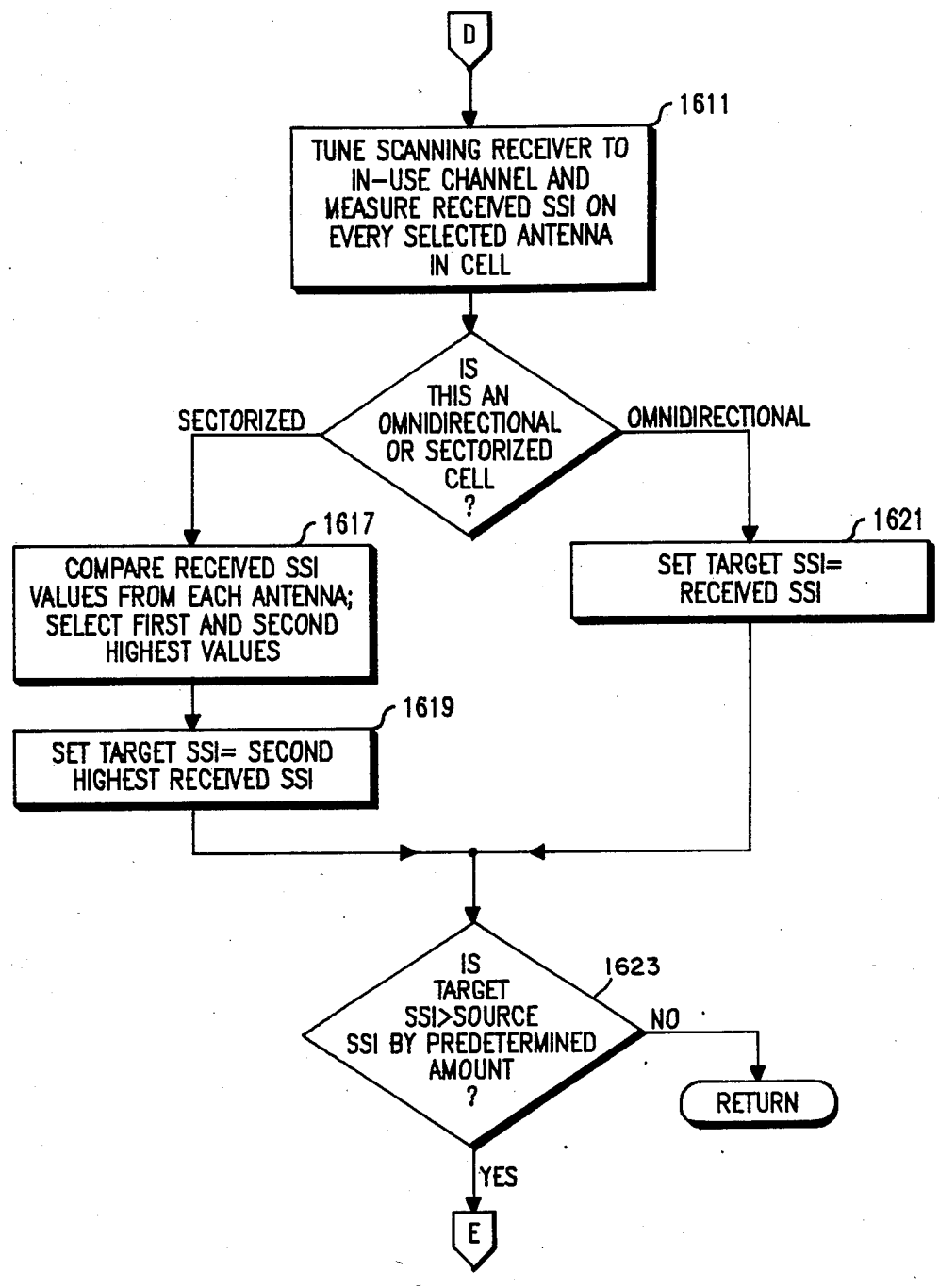
Figure 15D:
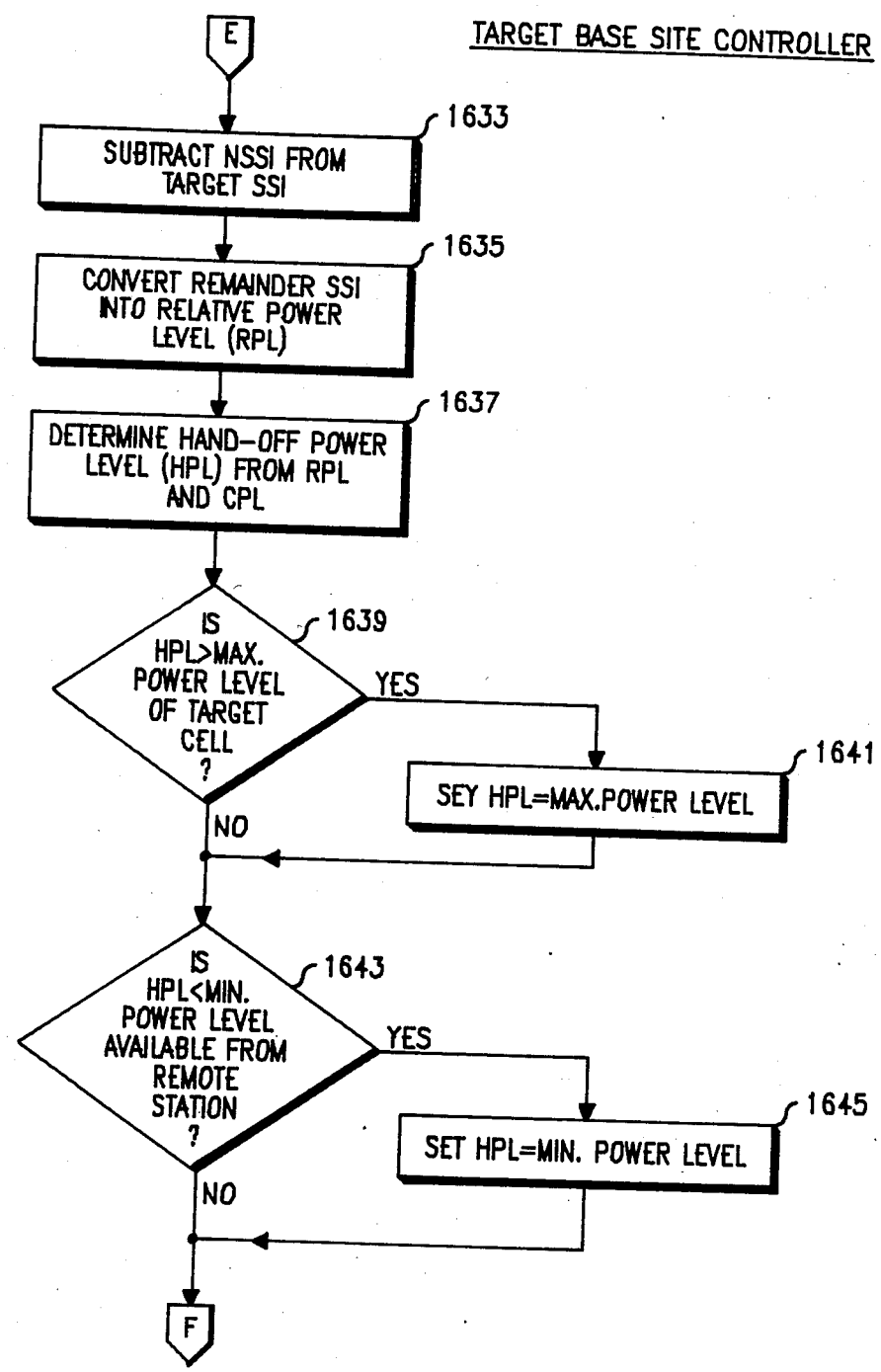
Figure 15E:
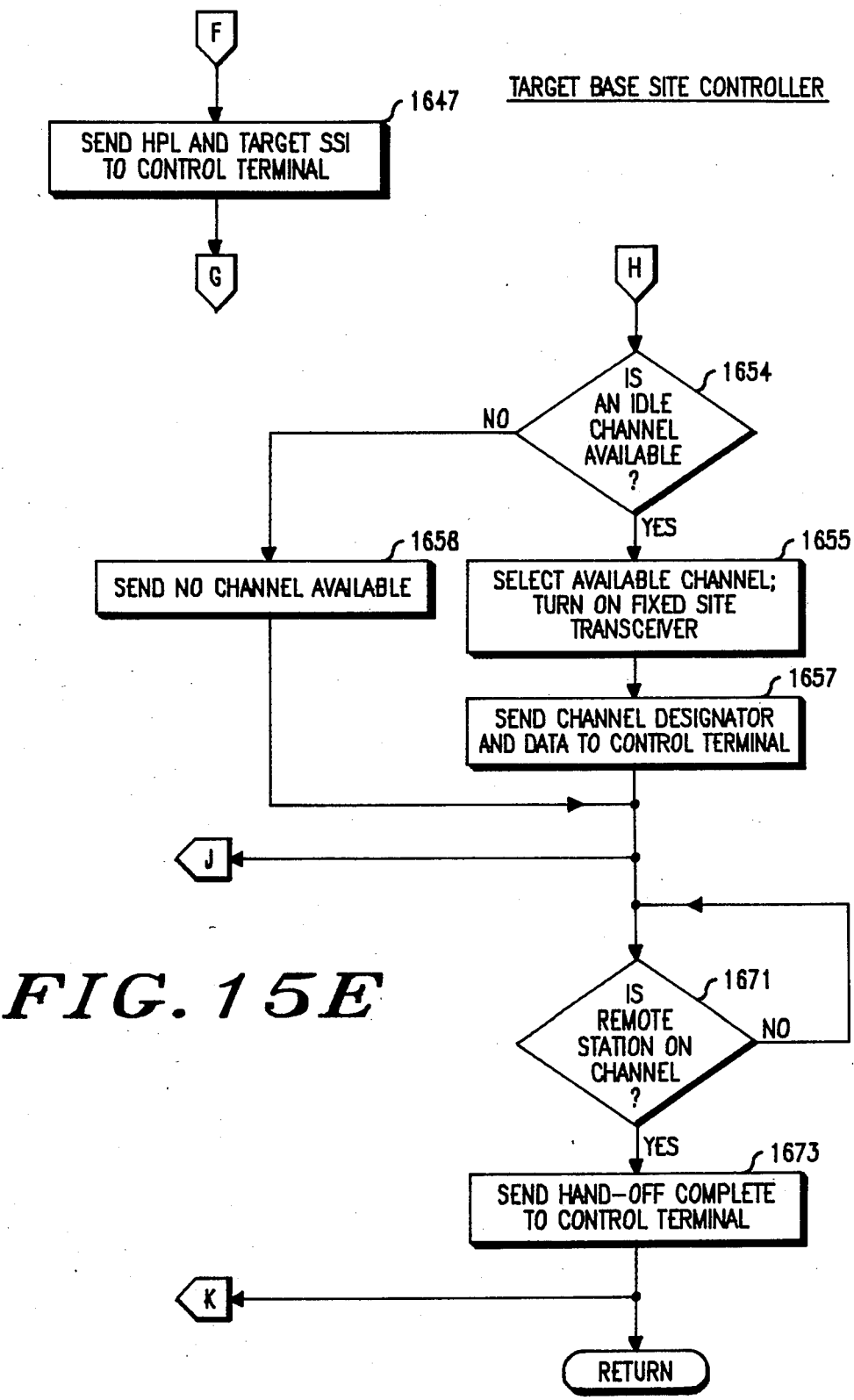

Referring now to FIGS. 15A through 15E, which should be arranged as shown in FIG. 16, the unique low power handoff method of the present invention may be visualized. When the source BSC determines that a remote station is a candidate for handoff, as described previously and shown in block 1601, the source BSC composes and sends a handoff request, including the current power level (CPL) and the value of the source SSI, to the control terminal (which may be control terminal 420 of FIG. 4) as shown in 1603. The control terminal (in FIG. 15B) receives the handoff request and initiates a signal strength measurement request and transmits the same request to the appropriate adjacent BSC's. at 1605. This request also includes the CPL and source SSI values. The response of one of the adjacent BSCs is shown in FIG. 15C through 15E. The scanning receiver of the target BSC is tuned to the channel in use at the source BSC and measures the received SSI on that channel at block 1611 as described previously. If this is a sectorized cell, the number of sectors to be scanned is determined by other system operating parameters and the scanning receiver proceeds in measuring the handoff remote station SSI on the in-use channel in the commanded sectors. When all the sectors have been scanned, all of the receiver SSI values are compared and the first and second highest SSI values are selected at block 1617.

One aspect of the present invention of particular significance is the fact that the target BSC SSI is set to the value of the second highest received SSI, as indicated in block 1619. This feature causes the remote station to be assigned a power level which is most likely to provide the least interference while still providing an acceptable signal quality. A person skilled in the art may elect to provide further comparison of SSI and perhaps utilize the first highest SSI in additional computational and selection loops. The preferred embodiment realizes a correlation between sector antennas which makes such additional processing unnecessary.

If the target BSC is not serving a sectorized cell, the target SSI is set equal to the receive SSI at block 1621. A determination is then made, at block 1623, whether the target SSI exceeds the serving SSI communicated from the source BSC by a predetermined amount. The determination of block 1623, which is known as handoff hysteresis, assures that the target BSC is receiving a signal from the remote station which will provide a signal quality at least equal to than that currently received by the source BSC. It is conceivable in some situations that the target SSI can be smaller than the source SSI, and still provide a signal quality equal or better than at the source BSC depending upon local conditions and system variations. If the determination from block 1623 is that the target SSI is not sufficient (no) the target BSC operating program returns to its ongoing processes.

If the handoff hysteresis level is determined to be adequate, at block 1623, the target BSC determines the handoff power level (HPL) to which the handoff remote station must be commanded if it is to be handed off to this target BSC. This calculation commences by subtracting the NSSI value from the target SSI value at block 1633. The remainder SSI indicates how much the received signal level in the target BSC exceeds the desired signal strength level (if the remainder is positive) or is lacking from the most desired signal strength (if the remainder is negative). The remainder SSI, which typically is a value having a wide dynamic range and in the embodiment of the present invention is expressed in hexadecimal form, is converted into a relative power level (RPL) which is generally an integer between 0 and 7 corresponding to the available power levels at the remote station, as indicated in block 1635. The conversion process in the preferred embodiment is a linear transformation by division and round-off of the wide dynamic range hexadecimal by a predetermined conversion factor number to yield the limited incremental steps of the relative power level. This conversion process, however, could also be a nonlinear transformation if the system parameters so required.

The handoff power level (HPL) is determined from the RPL and the CPL at block 1637 and in the preferred embodiment is determined by adding the RPL to the CPL. Thus, if the relative power level (RPL) indicates a reduction in power in order to achieve the NSSI desirable in the target BSC, the RPL is a negative number which is added to the current power level (CPL) and produces a handoff power level (HPL) which is smaller than the CPL. Conversely a relative power level (RPL) indicating a power increase necessary to achieve the NSSI causes a positive number to be added to the CPL to produce a HPL larger than CPL. Since it is possible for the target BSC to have a predetermined maximum power level established which is less than the full power output available from the remote station, the determined HPL must be prevented from exceeding the maximum power level of the target BSC. Additionally, the maximum power level available to any remote station is equal to a power level of 0 which is the ultimate maximum remote station power level. Therefore a determination of whether the HPL exceeds the maximum power level of the target BSC is made in block 1639. If the HPL exceeds the maximum power level, the HPL is set equal to the maximum power level at block 1641. If HPL does not exceed the maximum power level, the program process to block 1643. The minimum power level available from a remote station is a power level of 7. The HPL cannot be set to an integer greater than 7 and a determination is made at block 1643 whether the HPL has been set to an integer less than the minimum power level available from a remote station. If it is, the HPL is set at the minimum power level (7) at block 1645 and the program progresses to block 1647. The target BSC then sends the HPL and the target SSI to the control terminal as indicated in block 1647.

The control terminal receives all the target BSC target SSI and HPL data at block 1649. The control terminal then compares all the target SSI data and selects the strongest SSI at block 1651. In this way, the BSC reporting these strongest signal strength from the remote station on its current channel is selected to be the BSC to handle the call after the remote station is handed off. The control terminal responds to the target BSC reporting the strongest target SSI at block 1653.

The target BSC, in response to the control terminal selection, determines if it has a channel idle at 1654, selects that available channel in the sector or cell for which the target BSC is responsible, and turns on the fixed site transceiver at block 1655. The target BSC then sends the channel designation and data to the central controller at block 1657. If no channel is available at the target BSC, the target BSC sends a message to the control terminal (block 1658) so stating.

When the control terminal detects that the selected target BSC is ready with an available channel at block 1659, and sends the channel designator and HPL to the source BSC at block 1661. The control terminal then awaits the source clear indication from the source BSC and the handoff complete indication from the target BSC before completely exiting from the handoff process as shown at block 1663. Upon receiving the channel designator and HPL from the control terminal, the source BSC commands the remote station to tune to the designated channel with a power level indicated by HPL as indicated in block 1665. The format for this communication of a handoff command including HPL is set forth in EIA Interim Standard IS-3-B (July, 1984). When the source BSC detects that the remote station is clear from the channel at block 1667, it sends a "source clear" to the control terminal as indicated at block 1669. Likewise, the target BSC detects that the remote station has tuned to the designated channel at block 1671 and sends a "handoff complete" to the control terminal as indicated at block 1673.

There is a possibility that the target BSC selected by the control terminal does not have a readily available channel which may be assigned to a handoff remote station. If the target BSC is not ready with an available channel at block 1659, the control terminal may select the second strongest target BSC and respond to that particular target BSC at block 1675 and produce a handoff to the target BSC having the second strongest target SSI.

In summary, then, a cellular system employing power control of the remote station transmitter during and after handoff has been described and shown. The desired remote station transmitter power level to produce a nominal signal strength in a target cell or sector is calculated using signal strength measurement made on the in-use channel, the nominal signal strength, and a linear correlation of signal strength and remote station power level steps. The desired remote station power level is then transmitted to the remote station as part of the handoff command. Therefore, while a particular embodiment of the invention has been shown and described, it should be understood that the invention is not limited thereto since modifications unrelated to the true spirit and scope of the invention may be made by those skilled in the art. It is therefore contemplated to cover the present invention and any and all such modifications by the claims of the present invention.

I claim:

1. A method of interference reduction in a multichannel two way radio system having at least two geographic radio coverage areas established by a fixed site apparatus in each coverage area and a plurality of remote stations, each remote station capable of transmitting at one of a plurality of power levels and capable of being handed off from one coverage area to another, comprising the steps of:

calculating a power level for a remote station transmitting to fixed site apparatus in a first coverage area which will produce a received signal level of a predetermined magnitude at fixed site apparatus in a second coverage area; and communicating said power level to said transmitting remote station during a handoff of said transmitting remote station from said first coverage area to said second coverage area.

2. A method in accordance with the method of claim 1 wherein said step of calculating a power level furthe comprises the steps of:

measuring a received signal strength at fixed site apparatus in said second coverage area resulting from said transmitting remote station;

calculating a remainder signal strength from said received signal strength and a predetermined nominal signal strength;

transforming said remainder signal strength into a relative power level signal; and calculating a handoff power level from said relative power level signal and a current power level signal representative of said transmitting remote station current power level.

3. A method in accordance with the method of claim 2 further comprising the steps of:

measuring a received signal strength at fixed site apparatus in a third coverage area;

comparing the received signal strengths received at said apparatus in said second and third coverage areas; and selecting the weaker received signal strength.

4. A method in accordance with the method of claim 1 further comprising the step of limiting said power level to allow no more than a predetermined maximum remote station power level for said second coverage area.

5. A method of remote station handoff from transmission and reception on a first radio channel to transmission and reception on a second radio channel of a two way radio system having at least two radio channels and a plurality of remote stations, each remote station being able to transmit at one of a plurality of power levels determined by a current power level increment signal, the method comprising the steps of:

measuring a received signal strength resulting from transmission by an active remote station on the first radio channel;

calculating a remainder signal strength from said measured received signal strength and a predetermined nominal signal strength;

transforming said remainder signal strength into a relative power level increment signal;

calculating a handoff power level increment signal from said relative power level increment signal and the current power level increment signal; and conveying said handoff power level increment signal and a handoff command to said active remote station.

6. A method in accordance with the method of claim 5 wherein the first radio channel is employed in a first geographic radio coverage area and the second radio channel is employed in a second geographic radio coverage area, said received signal measuring step further comprising the step of measuring a second area received signal strength resulting from transmission by said active remote station on the first radio channel received in said second geographic radio coverage area.

7. A method in accordance with the method of claim 6 further comprising the step of measuring a third area received signal strength resulting from transmission by said active remote station on the first radio channel received in a third geographic radio coverage area.

8. A method in accordance with the method of claim 7 further comprising the step of selecting the weaker of said second area and third area received signal strengths as said measured received signal strength.

9. A method in accordance with the method of claim 5 wherein said step of calculating a remainder signal strength further comprises the step of subtracting said nominal signal strength from said measured received signal strength.

10. A method in accordance with the method of claim 5 wherein said step of transforming said remainder signal strength further comprises the step of converting said remainder signal strength into said relative power level increment signal by a linear arithmetic process.

11. A method in accordance with the method of claim 5 wherein said calculating a handoff power level increment signal further comprises the step of adding said current power level increment signal to said relative power level increment signal.

12. A method in accordance with the method of claim 5 further comprising the step of limiting said handoff power level increment signal to integers between predetermined integer values.

13. A method in accordance with the method of claim 5 further comprising the step of limiting said handoff power level increment signal to yield no more than a predetermined maximum remote station power level.

14. A two way radio system having at least two radio channels and the capability of handing off an active one of a plurality of remote stations from transmission and reception on a first radio channel to transmission and reception on a second radio channel, the active one remote station transmitting at one of a plurality of power levels determined by a current power level increment signal, the system comprising:

means for measuring received signal strength resulting from transmission by the active one remote station on the first radio channel;

means for calculating a remainder signal strength from said measured received signal strength and a predetermined nominal signal strength;

means for transforming said remainder signal strength into a relative power level increment signal;

means for calculating a handoff power level increment signal from said relative power level increment signal and the current power level increment signal; and means for conveying said handoff power level increment signal and a handoff command to the active one remote station on the first radio channel.

15. A two way radio system in accordance with claim 14 wherein the first radio channel is employed in a first geographic radio coverage area and the second radio channel is employed in a second geographic radio coverage area, said means for measuring received signal strength further comprising means for measuring a second area received signal strength resulting from transmission by the active one remote station on the first radio channel received in said second geographic radio coverage area.

16. A two way radio system in accordance with claim 15 wherein said means for measuring received signal strength further comprises means for measuring a third area received signal strength resulting from transmission by the active one remote station on the first radio channel received in a third geographic radio coverage area.

17. A two way radio system in accordance with claim 16 wherein said means for measuring received signal strength further comprises means for selecting the weaker of said second area and third area received signal strengths as said measured received signal strength.

18. A two way radio system in accordance with claim 14 wherein said means for calculating a remainder signal strength further comprises means for subtracting said nominal signal strength from said measured received signal strength.

19. A two way radio system in accordance with claim 14 wherein said means for transforming said remainder signal strength further comprises means for converting said remainder signal strength into said relative power level increment signal by a linear arithmetic process.

20. A two way radio system in accordance with claim 14 wherein said means for arithmetically calculating a handoff power level increment signal further comprises means for adding said current power level increment signal to said relative power level increment signal.

21. A two way radio system in accordance with claim 14 further comprising means for limiting said handoff power level increment signal to integers between predetermined integer values.

22. A two way radio system in accordance with claim 14 further comprising means for limiting said handoff power level increment signal to yield no more than a predetermined maximum remote station power level.

23. A base site controller for a cellular radiotelephone system which reduces co-channel and adjacent channel interference after handoff of remote transceivers, said remote transceivers transmitting at one of a plurality of power levels determined by a current power level increment signal, the base site controller comprising:

means for measuring received signal strength resulting from remote transceiver transmission on a first radio channel;

means for calculating a remainder signal strength by subtracting a predetermined nominal signal strength from said measured received signal strength;

means for transforming said remainder signal strength into a relative power level increment signal; and means for calculating a handoff power level increment signal, which determines the power level of the remote transceiver when handed off to a second radio channel, by adding said relative power level increment signal to the current power level increment signal.

24. A base site controller in accordance with claim 23 further comprising:

means for measuring received signal strength received on at least two antennas;

means for comparing said received signal strength from said at least two antennas; and means for selecting the weaker of the strongest two received signal strengths.

25. A base site controller in accordance with claim 23 further comprising means for limiting said handoff power level increment signal to yield no more than a predetermined maximum remote transceiver power level.

* * * * *